US008764238B2

(12) United States Patent
Brukilacchio

(10) Patent No.: US 8,764,238 B2
(45) Date of Patent: Jul. 1, 2014

(54) LIGHT EMITTING DIODE EMERGENCY LIGHTING MODULE

(75) Inventor: Thomas John Brukilacchio, Reading, MA (US)

(73) Assignee: Innovations in Optics, Inc., Woburn, MA (US)

(*) Notice: Subject to any disclaimer, the term of this patent is extended or adjusted under 35 U.S.C. 154(b) by 530 days.

(21) Appl. No.: 12/610,418

(22) Filed: Nov. 2, 2009

(65) Prior Publication Data

US 2010/0110660 A1 May 6, 2010

Related U.S. Application Data

(60) Provisional application No. 61/112,095, filed on Nov. 6, 2008.

(51) Int. Cl.
| | |
|---|---|
| *F21S 4/00* | (2006.01) |
| *F21V 21/00* | (2006.01) |
| *F21V 5/00* | (2006.01) |
| *F21Y 101/02* | (2006.01) |
| *F21K 99/00* | (2010.01) |

(52) U.S. Cl.
CPC ............. *F21V 5/008* (2013.01); *F21Y 2101/02* (2013.01); *F21K 9/00* (2013.01)
USPC ...... 362/249.06; 362/240; 362/247; 362/266; 362/218; 362/294; 362/301; 362/303; 362/328; 362/331; 362/332

(58) Field of Classification Search
USPC ................. 362/240–247, 268, 218, 294, 299, 362/301–303, 327–328, 331–332
See application file for complete search history.

(56) References Cited

U.S. PATENT DOCUMENTS

| | | | |
|---|---|---|---|
| 4,915,479 A | 4/1990 | Clarke | |
| 5,255,171 A * | 10/1993 | Clark | ............................ 362/231 |
| 6,205,998 B1 | 3/2001 | Winston | |
| 6,272,269 B1 | 8/2001 | Naum | |
| 6,318,863 B1 | 11/2001 | Tiao et al. | |
| 6,814,459 B2 * | 11/2004 | Pederson | ......................... 362/35 |
| 6,856,436 B2 * | 2/2005 | Brukilacchio et al. | ...... 359/204.2 |
| 6,967,986 B2 | 11/2005 | Kowarz et al. | |
| 6,968,103 B1 | 11/2005 | Schroll et al. | |
| 7,001,084 B2 | 2/2006 | Carpenter et al. | |

(Continued)

OTHER PUBLICATIONS

International Search Report and Written Opinion for PCT/US2009/005921 mailed on Jun. 18, 2010.

(Continued)

*Primary Examiner* — Thomas Sember
*Assistant Examiner* — Tsion Tumebo
(74) *Attorney, Agent, or Firm* — Schmeiser, Olsen & Watts LLP

(57) ABSTRACT

LED "Chip-on-Board" (COB) metal core printed circuit board (PCB) technology operates in conjunction with high efficiency compact imaging and non-imaging optics to provide a compact emergency light offering high performance luminance levels (higher brightness) and enhanced life, at low cost. Thermal impedance between the LED junction and the heat sink is significantly reduced for COB technology by placing the LED die directly on a high thermal conductivity material substrate thereby increasing temperature dependant life and thermally dependant output power. Additionally, there is no encapsulant or domed optic over the LED thus making it possible to get a much more compact and efficient substantially Etendue preserving collection optic directly over the die.

16 Claims, 19 Drawing Sheets

(56) References Cited

U.S. PATENT DOCUMENTS

| | | | |
|---|---|---|---|
| 7,008,079 B2* | 3/2006 | Smith | 362/235 |
| 7,189,983 B2* | 3/2007 | Aguirre et al. | 250/504 R |
| 7,234,820 B2 | 6/2007 | Harbers et al. | |
| 7,246,917 B2* | 7/2007 | Rhoads et al. | 362/241 |
| 7,455,410 B2 | 11/2008 | Furusawa et al. | |
| 7,481,538 B2 | 1/2009 | Furusawa et al. | |
| 7,963,666 B2* | 6/2011 | Leung et al. | 362/231 |
| 8,342,725 B2 | 1/2013 | Stein et al. | |
| 2002/0114168 A1 | 8/2002 | Pelka et al. | |
| 2004/0218390 A1* | 11/2004 | Holman et al. | 362/245 |
| 2005/0169579 A1 | 8/2005 | Temkin et al. | |
| 2005/0224846 A1 | 10/2005 | Kueper et al. | |
| 2005/0275819 A1 | 12/2005 | Tolbert et al. | |
| 2006/0043400 A1 | 3/2006 | Erchak et al. | |
| 2006/0061998 A1* | 3/2006 | Coushaine et al. | 362/298 |
| 2007/0206390 A1 | 9/2007 | Brukilacchio et al. | |

OTHER PUBLICATIONS

Welford, W.T. and Winston, R.,"High Collection Nonimaging Optics", Academic Press, pp. 55-64.

* cited by examiner

LIGHT EMITTING DIODE EMERGENCY LIGHTING MODULE

FIELD OF THE INVENTION

This invention, in general, relates to emergency lighting apparatus and, more particularly, to the use of light emitting diodes (LEDs) in high luminance emergency lighting systems.

BACKGROUND OF THE INVENTION

High brightness light emitting diode (LED) light sources are in high demand for challenging applications including emergency lighting. Prior art in the emergency lighting field typically utilize either tungsten or tungsten halogen lamps with colored filters or, more recently, systems incorporating pre-packaged high brightness LEDs. Emergency lights are used on vehicles such as police, fire, ambulance, tow trucks, construction vehicles, plows, as well as on vehicles in the aviation and marine fields.

Generally, emergency lighting is relatively narrow in spectral width, with the most widely used colors including blue, green, amber, and red. In some cases there is a demand for white light as well. Filtered halogen or tungsten halogen lamps by the physics of their material structure and design have a wide spectral distribution ranging from the ultraviolet to well into the infrared spectrum. Thus, creating narrow spectrum single color light from tungsten or tungsten halogen lamps is very inefficient and results in limited luminance.

Prepackaged LEDs are devices comprising an LED die or die array sitting on top of one or more thermally and electrically conductive materials, each with associated thermal impedance with electrical leads and thermal backplane that are then intended to be attached to yet another board with additional thermal impedance. Examples of prepackaged devices include the Luxeon™ and Rebel™ product lines now sold by Philips, the Osram Dragon™ and Ostar™ product lines, and the CREE X-Lamp™ product line. Companies including Code 3/PSE of St. Louis, Mo. and Whelen Engineering Company of Chester, Conn., have successfully launched products incorporating prepackaged LED devices in the emergency lighting market sector.

Consequently, there is a need for high performance, low cost, compact and reliable emergency lighting, and it is a principal object of this invention to satisfy this need.

Other objects of the invention will be obvious and will in part appear hereinafter with the following detailed description is read in conjunction with the drawings.

SUMMARY OF THE INVENTION

The invention herein describes an emergency light system which incorporates light emitting diode (LED) light sources with one or more distinct colors including broad band white light. The LED die or die array is mounted to a high thermal conductivity circuit board comprising "Chip on Board" (COB) technology which can include both the LED die and electronic drive components thus resulting in a more compact and reliable design with improved thermal and optical performance at lower cost relative to pre-packaged based LED systems.

The light from the typically blue, green, amber, red or phosphor coated blue (for white light) LED die or die arrays is collected by one or more typically non-imaging concentrators. The light is then directed toward one or more additional optical elements for the purpose of imaging the output of the non-imaging collection optic to the far field with low divergence in both the horizontal and vertical planes. The magnitude of the far field angle is fundamentally limited by the limitations of the overall package size available. The properties of the non-imaging collection optic result in substantially filling the rectangular aperture of the light module resulting in a system with improved appearance from near to far viewing distances.

A final optical element comprising a diffuser acts to increase the far field angular spread by a desired amount and profile along the horizontal and vertical planes. Typically, it is desirable to have an emergency light which can be viewed over a large range of angles about the normal in the horizontal plane and a relatively narrow range of viewing angles in the vertical plane. That is, a complete light bar assembly that would typically be mounted on top of a police car, for instance, should be viewable from all angles to an observer with an eye height above the ground roughly equivalent to that of the light bar, but without sending light upward into space or downward onto the ground (beyond angles required to account for vehicles sitting on the top of or bottom of a hill or valley respectively), which would only act to minimize the brightness available to the eye of the observer. The present invention fundamentally acts to provide a narrow beam of light in the horizontal and vertical planes which can then be redistributed as desired by passing through an appropriately structured diffuser element. A particular advantage of the invention is that different far field intensity distributions can be readily obtained simply by changing out the diffuser element only, with no change to the balance of the system. For example, if it is desirable to have different far field distributions for a system incorporating both blue and red light modules, the only change in the design between the two color light modules other than the LED die would be the diffuser. This commonality of parts further reduces the cost both to develop and to manufacture which translates to lower cost to the customer and a greater competitive advantage for the seller. Alternatively, the far field in the horizontal plane can be set primarily by the divergence from the collection optic without the need for a diffuser element.

BRIEF DESCRIPTION OF THE DRAWINGS

The structure, operation, and methodology of the invention, together with other objects and advantages thereof, may best be understood by reading the following detailed description in connection with the drawings in which each part has an assigned numeral or label that identifies it wherever it appears in the various drawings and wherein.

DETAILED DESCRIPTION

The present invention relates to Light Emitting Diode (LED) emergency lighting. In particular, the present invention is an LED based light source for improved luminance in a compact form factor and low cost relative to prior art.

Figure 1:
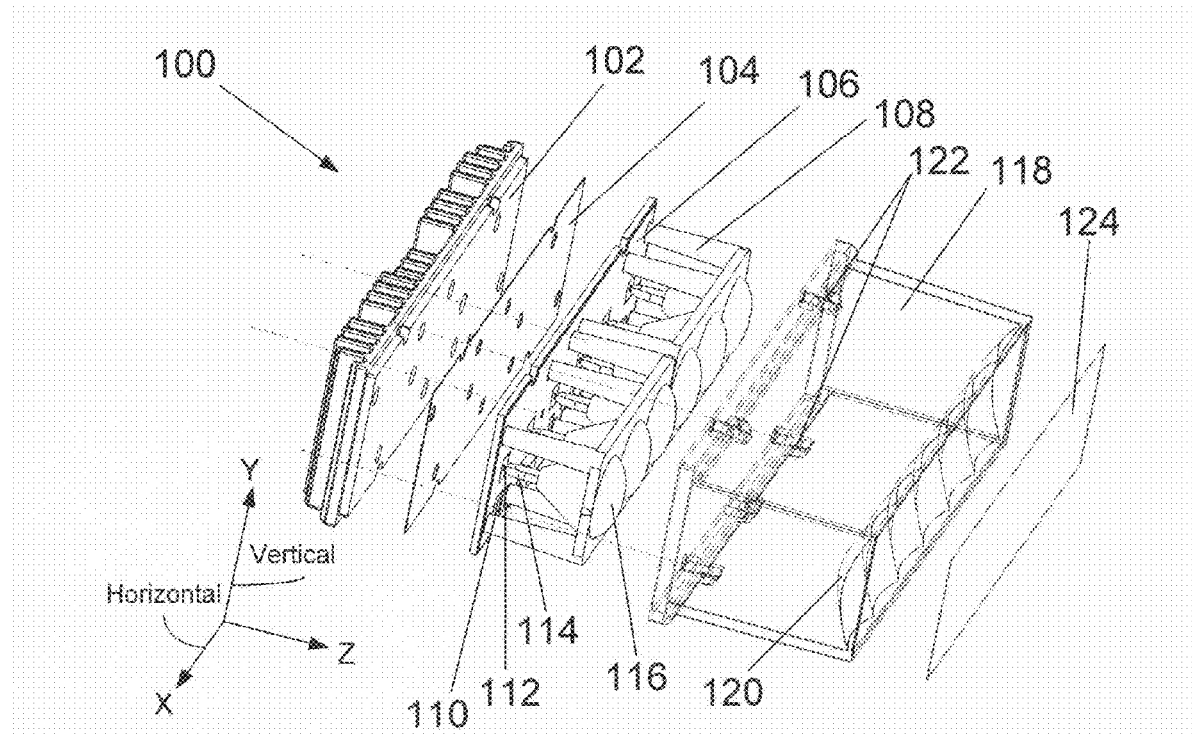
FIG. 1 is an exploded diagrammatic perspective view of a preferred embodiment of a 6-LED "Chip-on-Board" illumination module with application to emergency lighting comprising a heat sink, an LED metal core board with attached index matched collection opitc, a collimating lens array cover, and a diffuser to spread light preferentially along one axis.
Figure 2:
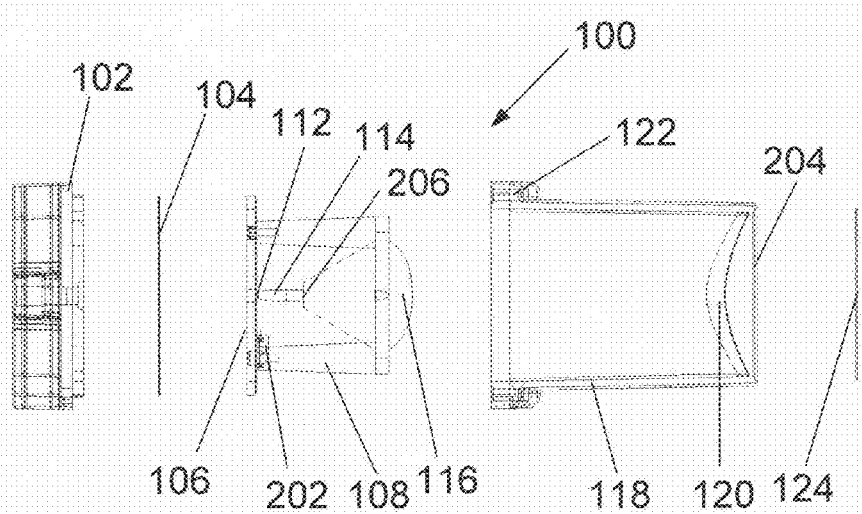
FIG. 2 is an exploded diagrammatic side elevational view of the system of FIG. 1.
Figure 3:
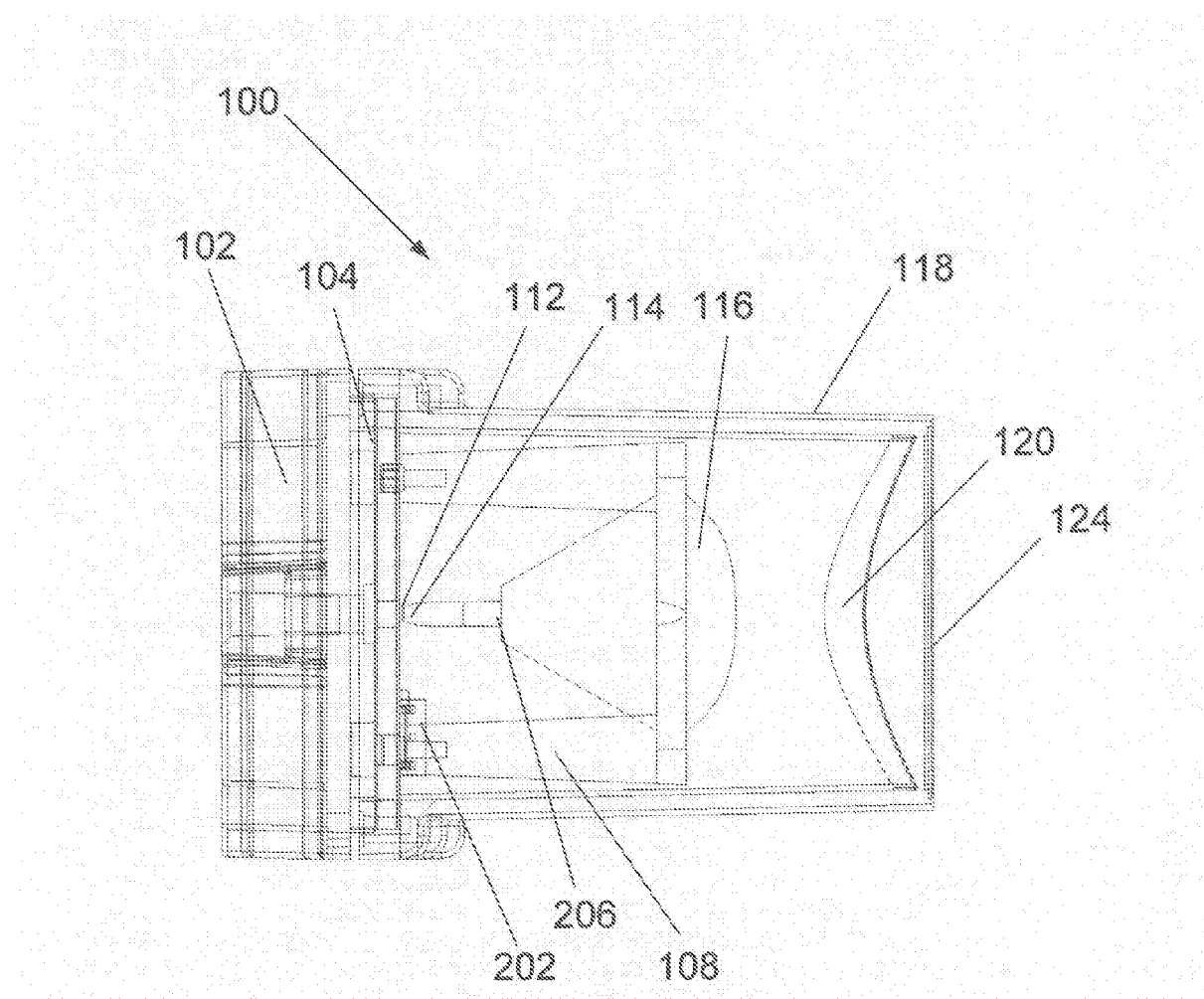
FIG. 3 is an unexploded diagrammatic side elevational view of the system of FIG. 2.

FIGS. 1, 2 and 3 show, respectively, an exploded isometric view of a preferred embodiment of the LED module designated generally at 100, an exploded view of LED module 100 in the Y-Z plane, and a collapsed side view of LED module 100 in the Y-Z plane. The LED module 100 comprises a "Chip-on-Board" (COB) metal core substrate printed circuit board (PCB) 106 with six (6) individual LED die 112 shown optically coupled to an associated individual non-imaging collecting optic section 114, one each for each LED die 112. Each non-imaging collecting optic section 114 has an input aperture on the order of the size of a square LED die 112, 1.1 mm, for example. The non-imaging collection optic section 114 is described in detail below.

The light that exits the output aperture of an individual collection optic 114 is converged by means of an associated corresponding lens section 116 toward lens array 120 which acts to collimate the light output with low far field divergence in both the horizontal and vertical directions. While the figures indicate refractive dielectric lens elements comprise lens elements 116 and 120, other means such as Fresnel lenses, kinoforms, mirrors, or diffractive lenses could be used as alternatives.

The light propagating from the collimation lens array 120 in the positive Z direction then enters a downstream diffuser 124 that is structured by design to spread the light predominantly in the horizontal (X-Z) plane. A preferred embodiment of the diffuser 124 would be of the type described as a randomized non-periodic structure which can be made by the interference of coherent light (holography) such as light shaping diffusers offered by Luminit of Torrance, Calif. or by engineered diffusers such as those offered by RPC Photonics of Rochester, N.Y., which are made by direct laser writing on photo resist to make the master followed by replication onto assorted substrates. These diffusers can be made on substrates such as plastic or glass with a primary advantage of high transmitted efficiency relative to other diffusers such as frosted glass and also offer greater control over the far field patterns that can be obtained. A typical diffuser for the system 100 would be made out of a material substrate such as polycarbonate with a thickness on the order of 0.250 mm. Diffusers can be made to affect the spread of light differently along the horizontal and vertical axes. Such diffusers are typically referred to as elliptical diffusers, as the far field distribution that results from collimated, normally incident, low divergence incoming light is elliptical in profile. Thus, the design provides a large range of far field distributions that are the result of convolving the far field distribution of the optical system without the diffuser with the far field distribution of the diffuser response to normally incident collimated light with no divergence. The diffuser response is described in more detail below.

There are benefits to both performance and cost in using COB metal core PCB's to directly attach the LED die or die arrays relative to prior art, which typically use pre-packaged LED devices. The thermal impedance between the LED die 112 and a preceding heat sink 102 is much lower with the directly attached COB approach. Pre-packaged LED emitters have many additional layers of higher thermal impedance which means that at high current densities the COB system results in a much lower LED junction temperature which, in turn, leads to improved optical power and lower temperature operation. This translates into longer and more reliable product life. Additionally, fewer LED die can be used due to the higher performance for the COB approach further reducing system cost.

The COB approach is also much lower in cost relative to the use of pre-packaged LED devices since there are fewer parts and fewer process steps to make a finished unit. The thermal performance advantage is particularly acute with respect to amber LED die with a photometric peak around 590 nm, as this LED material structure is much more sensitive to increased temperature which results in a drop in optical power. The thermal impedance with a COB LED solution can be as low as one (1) C.°/W or lower in comparison to typical values on the order of eight (8) to ten (10) C.°/W for pre-packaged devices. Examples of pre-packaged devices include the Luxeon™ and Rebel™ product lines now sold by Philips, the Osram Dragon™ and Ostar™ product lines, and the CREE X-Lam™ product line. There are now several vendors producing COB metal core LED boards such as those available from The Bergquist Company of Chanhassen, Minn. The lowest thermal impedance is obtained by mounting the LED die 112 directly to the metal core, typically copper or aluminum substrates. However, that approach requires that the LED die have common anodes (bottom contact). Other high performance board substrates include, but are not limited to, composite materials such as aluminum or copper and silicone carbide, graphite or CVD diamond. To be able to drive the LED die 112 in series, however, which is required for some applications and drive circuits, there must be a thermally conductive, but electrically insulating layer with a copper foil above it to attach the die to. The thickness of the copper foil can be increased from one (1) oz. to the order of ten (10) oz. to act as a heat spreader thereby reducing the heat flux in passing through the electrically insulating layer. The dielectric is typically on the order of 0.075 mm or less and typically has a thermal conductivity on the order of 2 W/m-K in comparison to the order of 160 W/m-K for aluminum and 370 W/m-K for copper. The facts that the dielectric is very thin and the heat flux is reduced by thermal spreading in the foil layer that the die is directly attached to in the case of series operation, minimizes its effective thermal impedance.

An additional benefit of using COB PCB technology is that electrical drive circuit devices 110 and 202, such as one of the commercially available current controlling integrated circuits (IC's) that have recently been developed for LED applications along with the required auxiliary components including resistors, capacitors, inductors, and diodes, can be attached directly to the COB PCB by standard surface mount techniques well know in the art thereby eliminating the need for the added cost, space, and complexity of additional external drive circuitry. A wire harness or electrical connector can be mounted directly to the COB PCB to get power and or control signals to and from the board. A temperature sensing device such as a thermistor is often added to the COB PCB to monitor temperature. If closed loop intensity operation is required, a light detection and control circuit can also be added to the COB PCB to account for changes in light output as a function of time and temperature. COB PCB's can have multiple layers attached by standard electrical vias with successive foil layers separated by the same dielectric described above.

The heat from the COB PCB 106 is conducted to the heat sink 102 by use of a thermally conductive conformal pad 104. Such thermal pads 104 are available from companies such as The Bergquist Company referenced above. They are available in a range of thicknesses, thermal impedances, electrical conductivity, and material compliance. Alternatively, a thermally conductive paste can replace the thermal pad 104, but pastes can be awkward in volume production and are not generally preferred. The fins on the heat sink 102 are generally oriented in the vertical direction to work best in free convection if forced air was not available.

Collection optics 114 and associated output-lenses 116 are shown molded as three (3) sections per part, and in a preferred embodiment, are made out of a highly transparent optical grade thermal plastic, such as acrylic, polycarbonate, cyclic olefins (such as is available from Zeon Chemicals), or other transparent materials such as glass or silicone. Depending on the application, the effect of short wavelength light, such as blue or ultraviolet, should be considered with respect to yellowing with time. Some grades of the above materials offer superior transmission in the shorter wavelengths and should be considered in such cases. The motivation for not molding all six (6) collection optics 114 and associated lenses 116 into one molded part is driven by the differential thermal expansion between the metal core substrate material and the dielectric material of the optics. By splitting the optics into two parts, the issue is reduced to a tolerable level. Each group of three collection optic 114 and associated lens 116 has 6 legs 108 each with opposite corners having a round pin and oval pin which engage into tightly toleranced holes in the PCB to assure that the input apertures of the collection optic 114 match up with respect to position in the X-Y plane to the LED die 112 in a kinematic geometry. If the dielectric optics were to be made out of a single molded piece rather than two, the differential expansion between the PCB 106 and the optic would move the input apertures relative to the LED die. This movement would have two effects. First, it would potentially reduce the amount of light that would couple from the LED die 112 into the collection optic 114, and secondly, it could cause delamination between the refractive. index matching silicone gel and the input aperture of the collection optic 114 or between the LED die 112 and the gel, which would result in loss of light. The purpose of the index matching gel is to increase the extraction efficiency of the light generated within the LED die junction out of the LED die by means well know in the art and understood by Snell's Law and is driven by the high index of refraction of the LED junction itself. Low durometer two-part silicone gels specifically formulated for index matching to high brightness LED die are typically used and are available from companies such as Nusil Technology LLC, of Carpinteria, Calif.

A cover 118 (See FIG. 3) is provided and is structured to snap to the PCB 106 while serving several functions. First, the cover 118 comprises a collimating optic array 120 that is comprised of individual refracting surfaces having a one-to-one correspondence with the individual lenses 116. The refracting surfaces of collimating optic array 120 redirects the light exiting the collection optic lens portion 116, which images the output of the non-imaging collection optic section 114 to infinity. Secondly, the cover 118 acts as a protective cover for the balance of the optics. Thirdly, cover 118 acts as a support for the optics array 120 and contains four (4) symmetrically located self tapping holes 122 which allow self tapping screws entering from the far side of the heat sink 102 to sandwich the thermal pad 104 and PCB 106 together as indicated in FIG. 3 with sufficient pressure to achieve the required thermal conduction between the PCB 106 and heat sink 102. Similarly, self taping screws hold the collecting optics to the PCB 106. The metal core substrate of the PCB 106 acts to spread the heat from the six (6) LED die 112 prior to transferring through the thermal pad 104 to the heat sink 102 thereby minimizing the thermal impedance resulting from the thermal pad 104.

Figure 4:
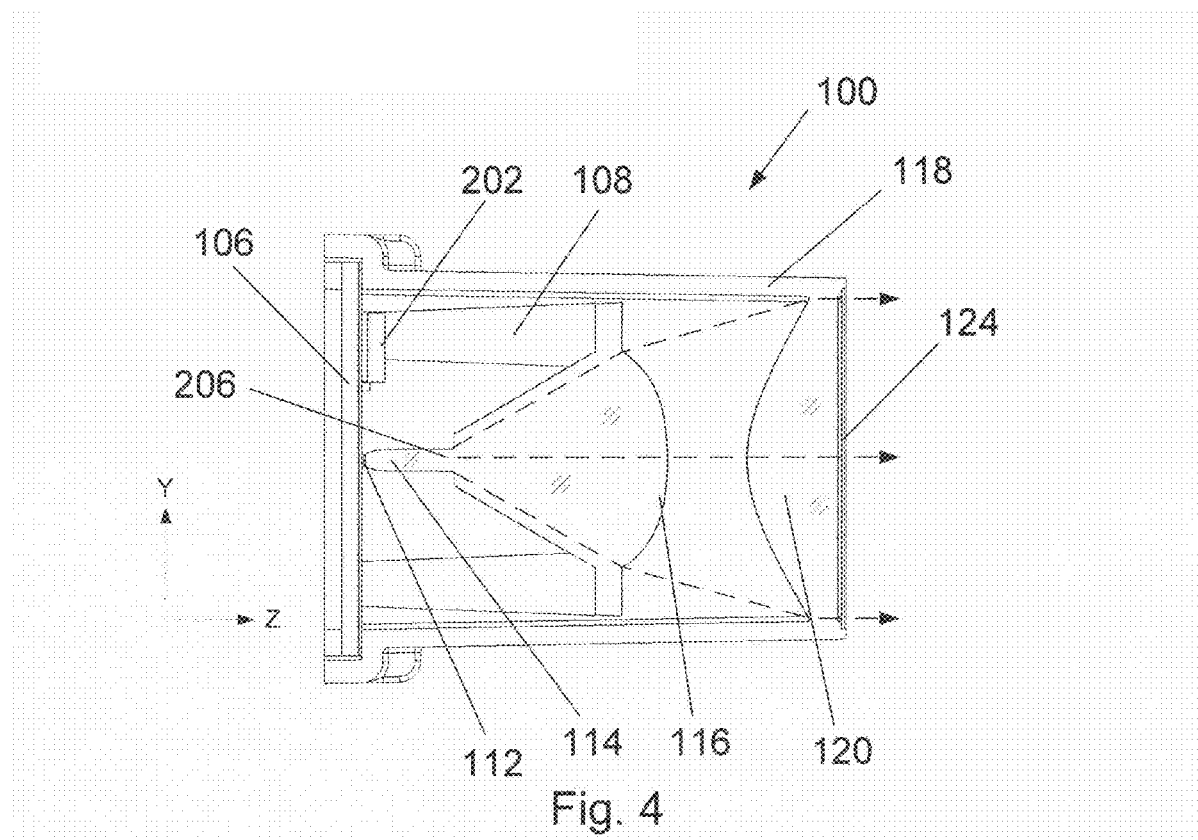
FIG. 4 is a diagrammatic side elevational cross section of the system of FIG. 3 with the heat sink removed.
Figure 5:
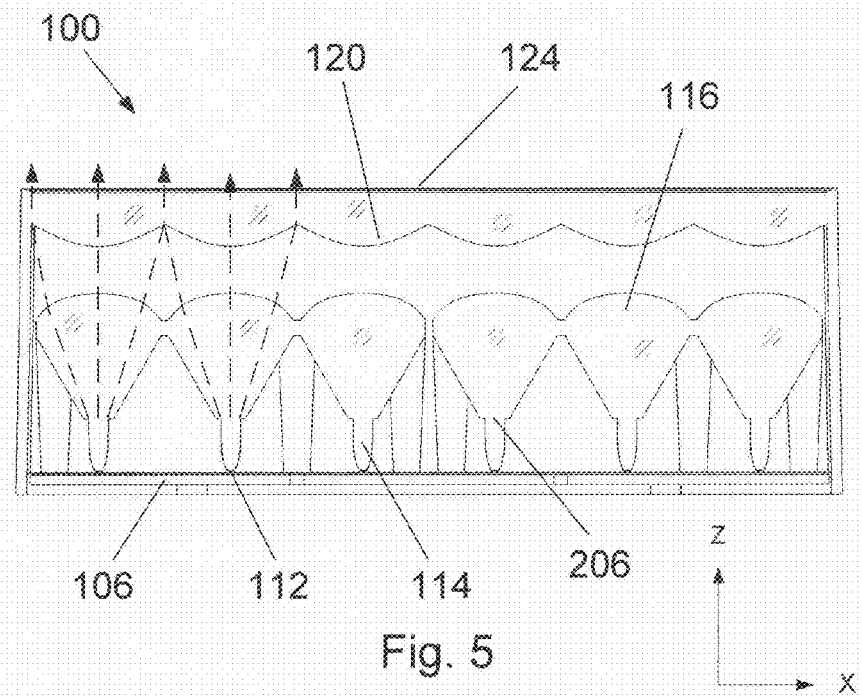
FIG. 5 is a diagrammatic plan view of the system of FIG. 4 with parts removed.

FIG. 4 shows a diagrammatic side elevational view, in the Y-Z plane, of portions of the module 100 and FIG. 5 shows a diagrammatic plan or top view, in the X-Z plane, of system 100 of FIG. 1. The dotted lines indicate how the light exiting the collection optic 114 at position 206 is imaged by lens section 116 and collimating lens array 120. Thus, the far field angles in the horizontal and vertical directions are proportional to the dimensions of the output of the collection optic 114 at 206. The narrower height of the output aperture at 206 in the Y-Z plane results in a larger divergence angle more fully filling the lens section 116 and collimating lens 120 in comparison to the smaller divergence exiting section 114 at 206 in the X-Z plane. This is evidenced by the smaller extent of the rays depicted by the dotted lines with arrows in FIG. 5 relative to FIG. 4. Generally, the requirements for the type of emergency light of the system of FIG. 1 are used within a car top mounted light bar on police cars for which it is desirable to have the light visible over a large angle in the horizontal plane, but not to have too much light diverging into the vertical plane, which would only be launched into the ground or up into space and would thereby reduce the light to the intended observer. For this reason, it is desirable to maintain a small dimension of the aperture 206 in the Y-Z plane as is accomplished by the present invention of the system of FIG. 1. The details of the exact design are established using well-known ray tracing programs (e.g. Code V, TRACEPRO, or ZEMAX) with knowledge of the material composition, geometry of the optical elements, and operating wavelengths.

Figure 6:
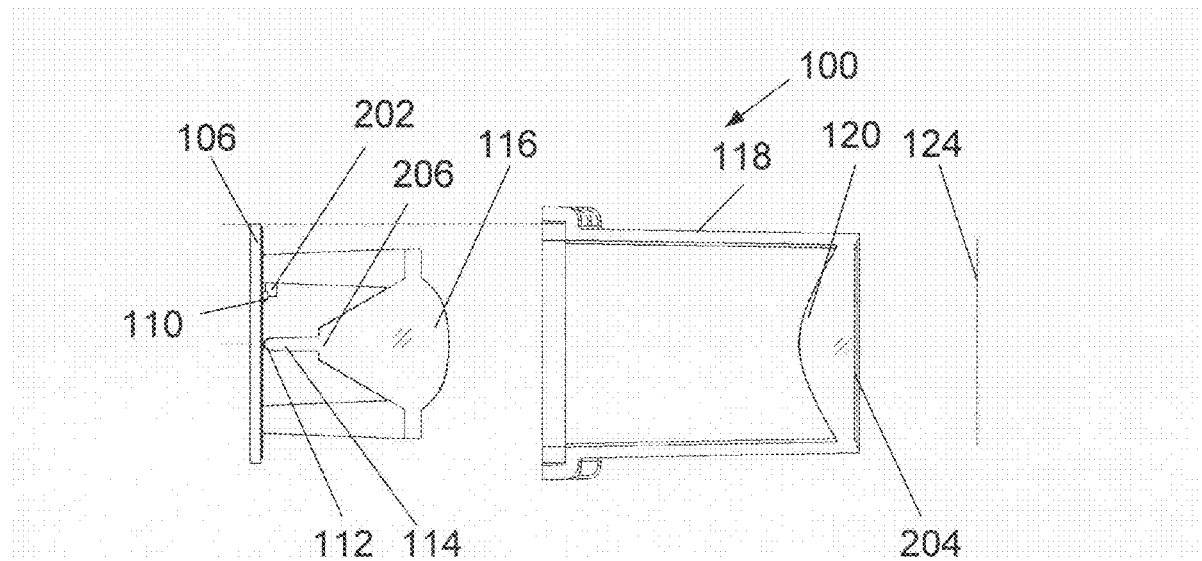
FIG. 6 is an exploded diagrammatic view of the system of FIG. 4.
Figure 7:
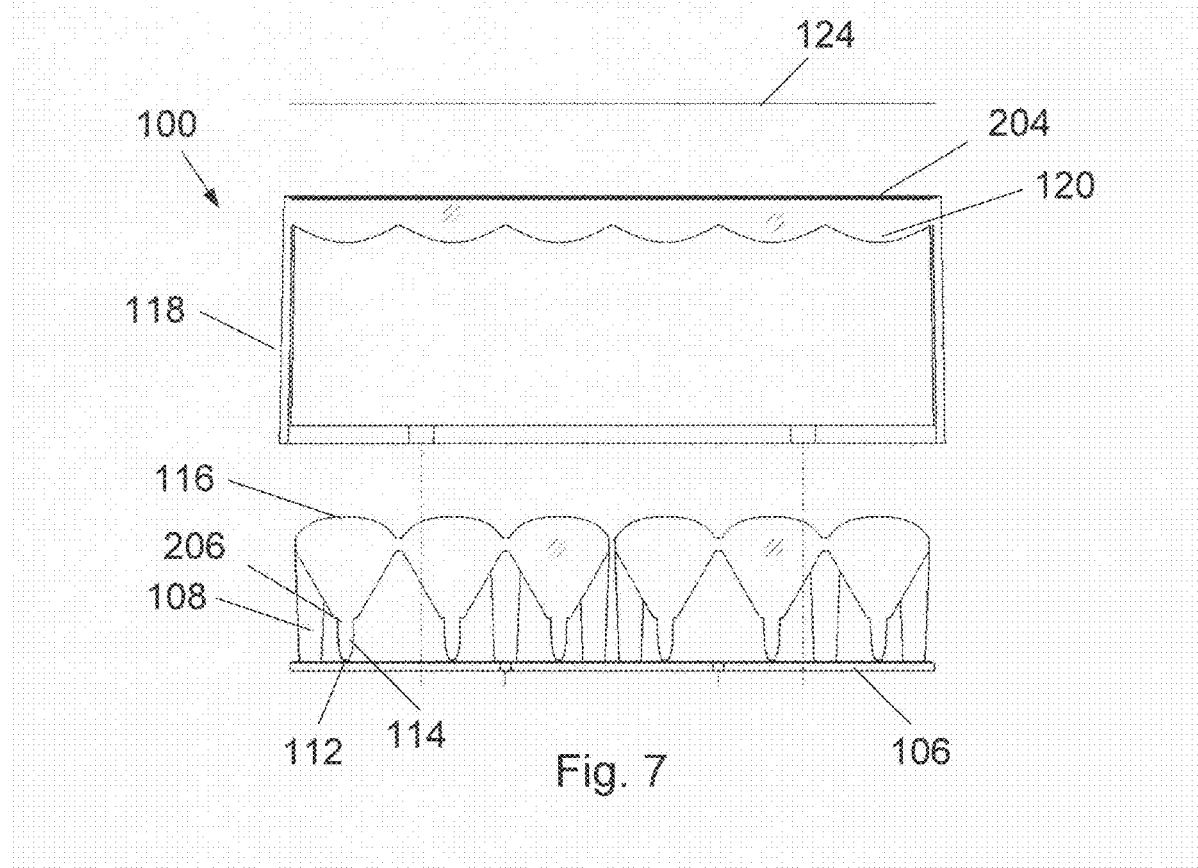
FIG. 7 is an exploded diagrammatic view of the system of FIG. 5.

FIGS. 6 and 7 show exploded diagrammatic elevational and top plan views, respectively, of the embodiments of FIGS. 4 and 5. Note that a complementary configured pocket is molded into the cover 118 to accept the diffuser 124 which could be attached by a number of methods including optical adhesive. It is important to note that the diffuser 124 works most effectively with the light entering the patterned side and exiting the smooth non-patterned side which would be facing outward. It is possible to achieve a large degree of divergence from having the pattern on the outside, but not to the same extent as it is for the pattern on the inside. Thus, an alternative embodiment of the diffuser would be molded directly onto the outer surface of the lens array 120.

Figure 8:
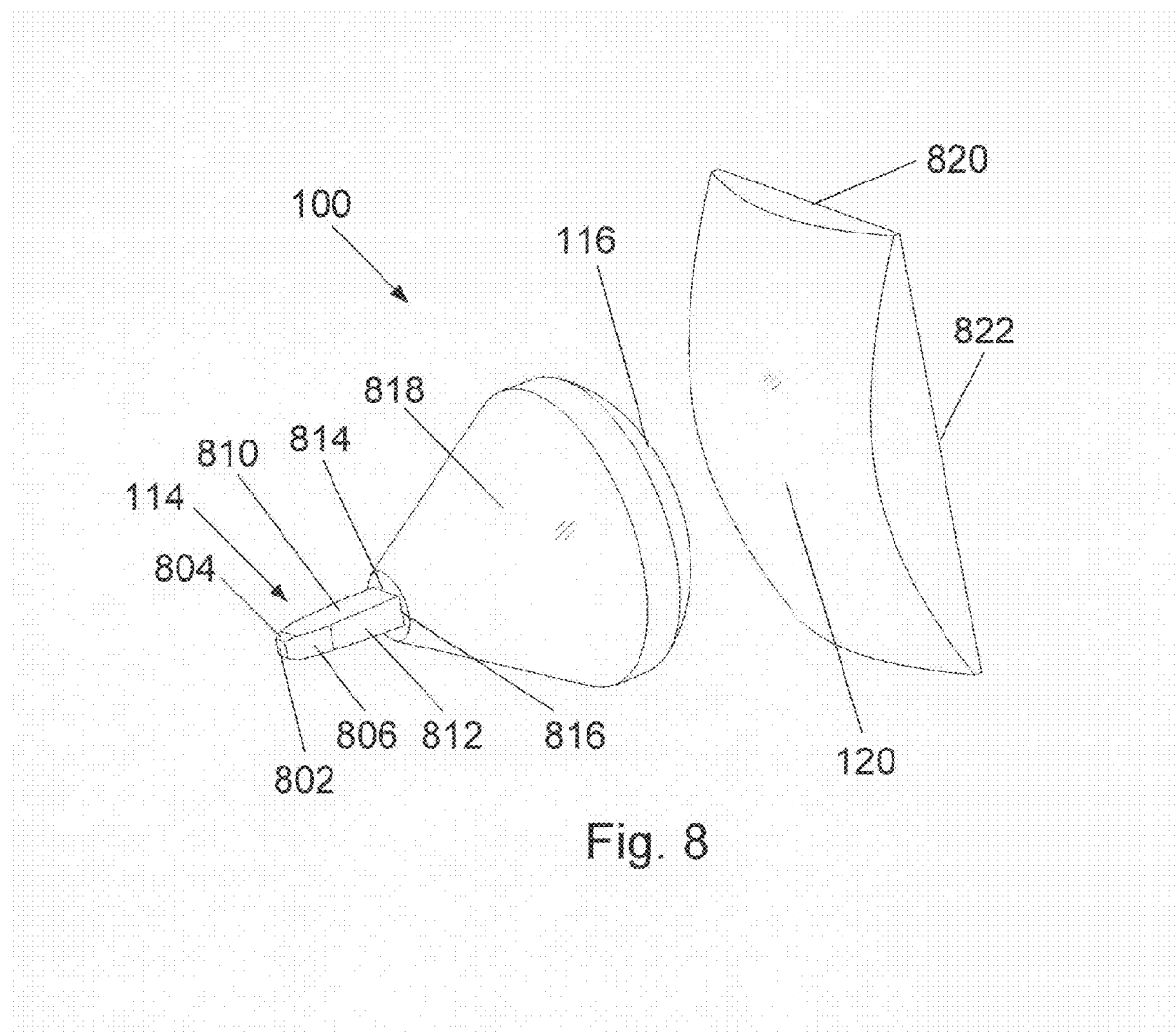
FIG. 8 is an isometric diagrammatic view of one set of the collection and collimating optics of the system of FIG. 1.

FIG. 8 shows a detailed diagrammatic perspective (isometric) view of one representative or typical set of collecting and light shaping optics out of 6 of the system of FIG. 1. The LED die is positioned in close proximity to an input aperture 802 and is refractive index matched with a dielectric material such as silicone gel as previously described. Thus, the angular extent just inside the non-imaging collection optic section 114 is substantially hemispherical. Opposite sides of the optical concentrator 114 are symmetric. The sections 804 and 806 are compound parabolic concentrator (CPC) sections of the type described by Winston and Welford in a book entitled "High Collection Nonimaging Optics" published by Academic Press and are made of tilted and shifted parabolic sections according to the edge ray principle. For the practical reason of assuring that the optic can be released from the mold, sections 810 and 812 are drafted. Ideally, the draft is made tangent to the CPC sections 804 and 806 respectively. The draft has minimal impact on the output relative to that which would be obtained by extending the section 806 all the way to its normal length. The rectangular cross section is extended beyond its normal CPC length to increase the length of the collection optic section 114 for the purpose of increasing the light uniformity at its exiting aperture at 814 and 816 representing the long horizontal and narrow vertical outputs of the collection optic section 114. The lens 116 is attached to the collection optic 114 by means of the material 818 bridging the gap. This is primarily for the purpose of minimizing losses due to Fresnel reflections and reducing the total number of optical elements for reduced complexity and cost. The reason for having the lens section 116 is for the purpose of reducing the overall physical distance between the LED die and the output at the diffuser 124. If sufficient length were available for a given application, the lens section 116 could be eliminated and the optical system would consist of the collection optic section 114 and the collimating lens 120 only. The length of the side of the lens 120, in the horizontal plane depicted by side 820, is dictated by the requirement for maintaining minimal dimensions between the first and last LED die. The motivation for having the vertical dimension 822 of the lens 120 to be greater than the length of side 820 is that of achieving the smallest possible divergence in the vertical plane within the confines of the maximum allowable height of the entire module. One important aspect of the output of a rectangular cross section CPC such as represented by 114 is that it has a substantially rectangular far field which means the rectangular lens aperture defined by sides 820 and 822 are substantially filled with light. Thus, from the outside, the entire rectangular aperture of lens array 120 is substantially filled with light, which is a desirable quality to the viewer and leads to a higher perceived brightness. This is related to the fact that the human eye has a logarithmic response to light. If all the light, when observed from a distance, appears to be coming from a small point in comparison to a more extended source, with the same amount of optical energy, the slightly more extended source will appear brighter because it appears to be of similar intensity, but larger in size giving the perception of more light. That is, once your eye approaches the point of light saturation, a physically brighter source may not appear any brighter, so a larger source of equivalent total energy will be perceived as brighter (photometric power per unit solid angle). Thus, it is advantageous to be able to use the total area of the output aperture of the light source as opposed to substantially circular beams of light or substantially point sources observed in prior art. In terms of compactness, this approach provides overall dimensions for the combined envelope around the CPC 114 and following shaping optics a package of about 30 mm high by 130 mm wide (looking head-on) by about 130 mm deep (from front to back).

Figure 9:
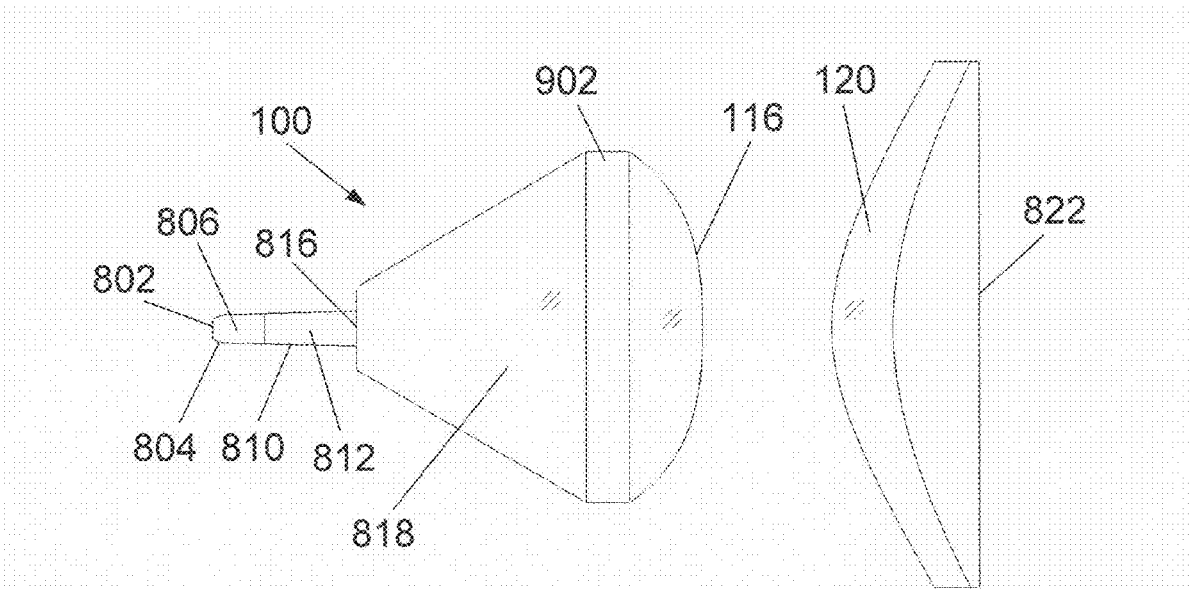
FIG. 9 is a diagrammatic elevational view of one set of optics from the elevational, side-on view of FIG. 4.
Figure 10:
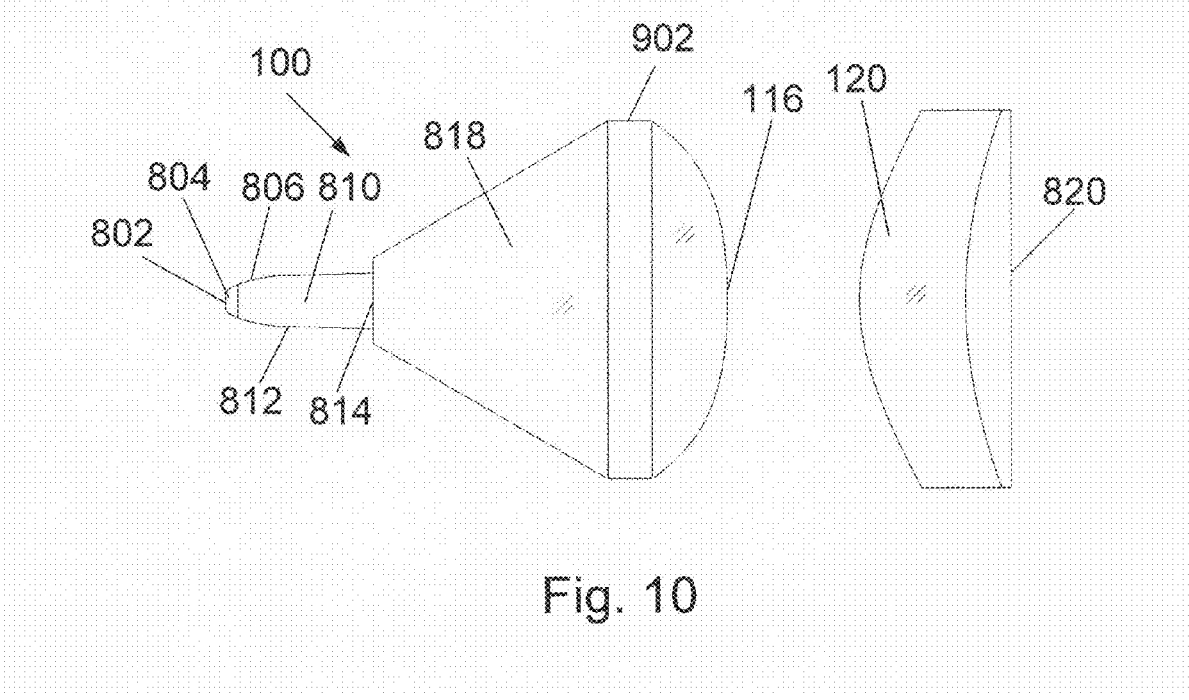
FIG. 10 is a diagrammatic top view of one set of optics from the perspective of FIG. 5 which is orthogonal to FIG. 9.

FIGS. 9 and 10 diagrammatic elevational views of the Y-Z plane and the X-Z plane, respectively, illustrating the inverse relationship between the dimensions of the output apertures 816 and 814 to the heights 822 and 820 of the collimating lens 120.

Figure 11:
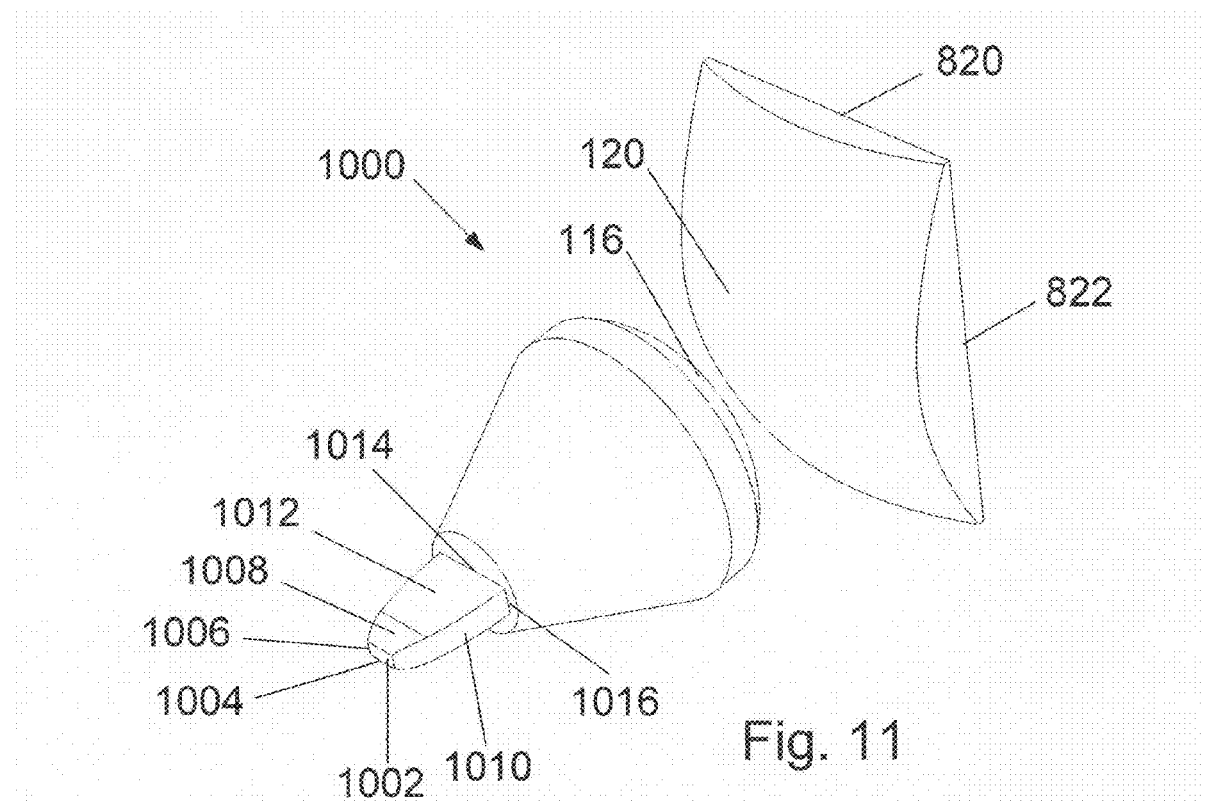
FIG. 11 is a diagrammatic perspective view of the system of FIG. 8 with a collection optic input aperture increased in size to accommodate two side by side LED die for the purpose of increasing luminance.

FIG. 11 shows an alternative embodiment 1000 to the non-imaging portion 114 for the system 100 of FIG. 8. The input dimension of an entrance aperture 1002 has the same vertical dimension 1006 as that of 100, but has twice the horizontal dimension 1004, allowing for the use of a 1×2 array of the LED die used in system 100. Thus, the far field extent in the vertical dimension of 1000 is the same as that of 100, but the horizontal extent of the far field is twice that of 100. Given that the second LED is operated at the same current density as that of the system of 100, the system of 1000 yields approximately twice the large angle luminance in the horizontal direction in the far field, but approximately the same luminance in the center as the non-diffused far field would have twice the dimension in the horizontal direction only. This assumes that the extent of the width of 822 is designed as not to vignette the light exiting 116 in the horizontal (X-Z) plane. In this case, section 1010 may not have added draft as not to be too long in comparison to section 114 of 100.

Figure 12:
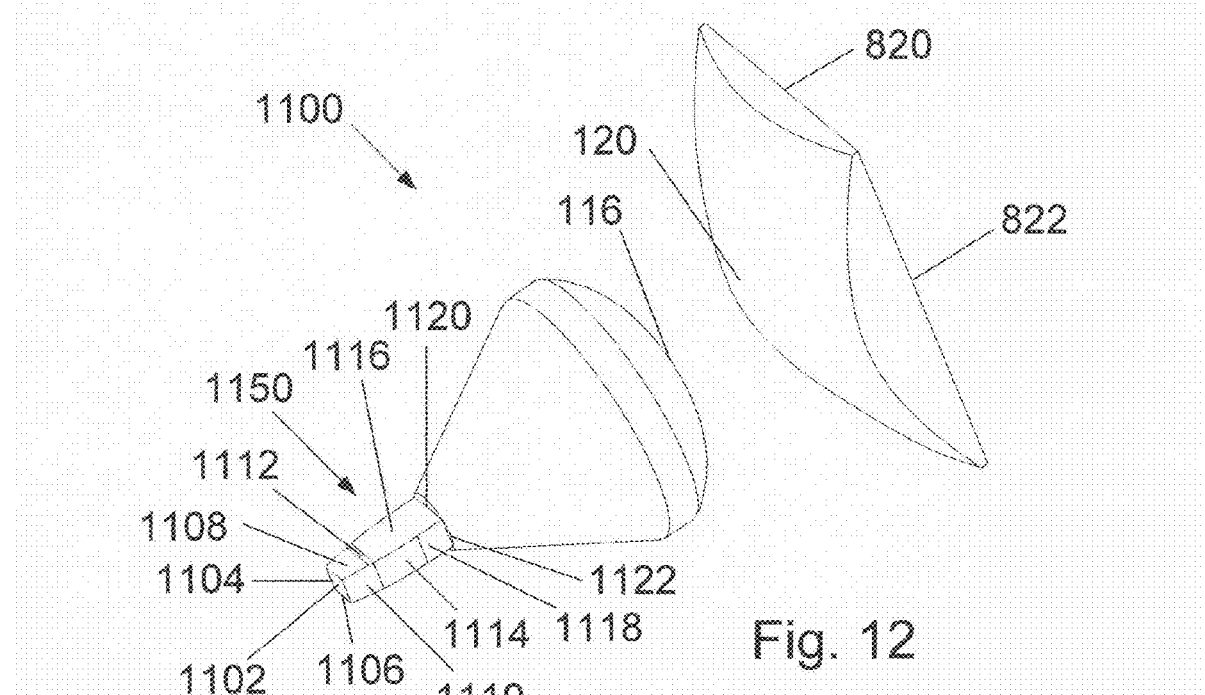
FIG. 12 is a diagrammatic perspective view of an optical system similar to the system of FIG. 8 with the non-imaging collection optic replaced by a rectangular θ by θ concentrator for use without index matching, such as could be done for white LEDs.

FIG. 12 represents a single optical system 1100 similar to that of system 100 of FIG. 8, but with non-imaging section 1150 replacing section 114. Section 1150 has an input dimension equivalent to a two by two (2×2) array of LED die sized similar to the LED die depicted in the system of FIG. 1. In the case of system 1100, the array is not refractive index matched as would be the preferred configuration for a white LED array comprised of 4 blue LED die in a 2×2 configuration covered by a phosphor. The phosphor is of a type such as cerium doped YAG (Ce:YAG) that is well know to the art or one of the alternative yellow phosphors available from companies such as Intematix of Fremont, Calif. A portion of the blue light emitted by the LED die is absorbed by the phosphor and re-emitted as yellow light which, in combination with the scattered, but non-absorbed blue light, produces the appearance of white light. Typically, the phosphor is held in place on the emitting surface of the LED die with a silicone material. Since the LED is already index matched by the silicone/phosphor matrix, there is no further advantage to index matching and higher brightness is achieved without the use of index matching silicone gel between the phosphor coated LED die and the input aperture 1102, as understood from the index of refraction contribution to the well know Etendue (area—solid angle-refractive index squared-product). Thus, since the light just inside the dielectric material of section 1150 does not extend over a hemisphere, but is reduced by the well know Snell's Law, the CPC sections 1114 and 1112 are truncated with straight conical sections 1110 and 1108, respectively, as described by Winston and Welford as a θ by θ compound parabolic concentrator. Sections 1118 and 1116 comprise the drafted walls analogous to sections 812 and 810 of the system 100 of FIG. 8.

This type of optical system in conjunction with white LEDs functions as a very effective white take down light replacing tungsten halogen systems found in prior art.

Figure 13:
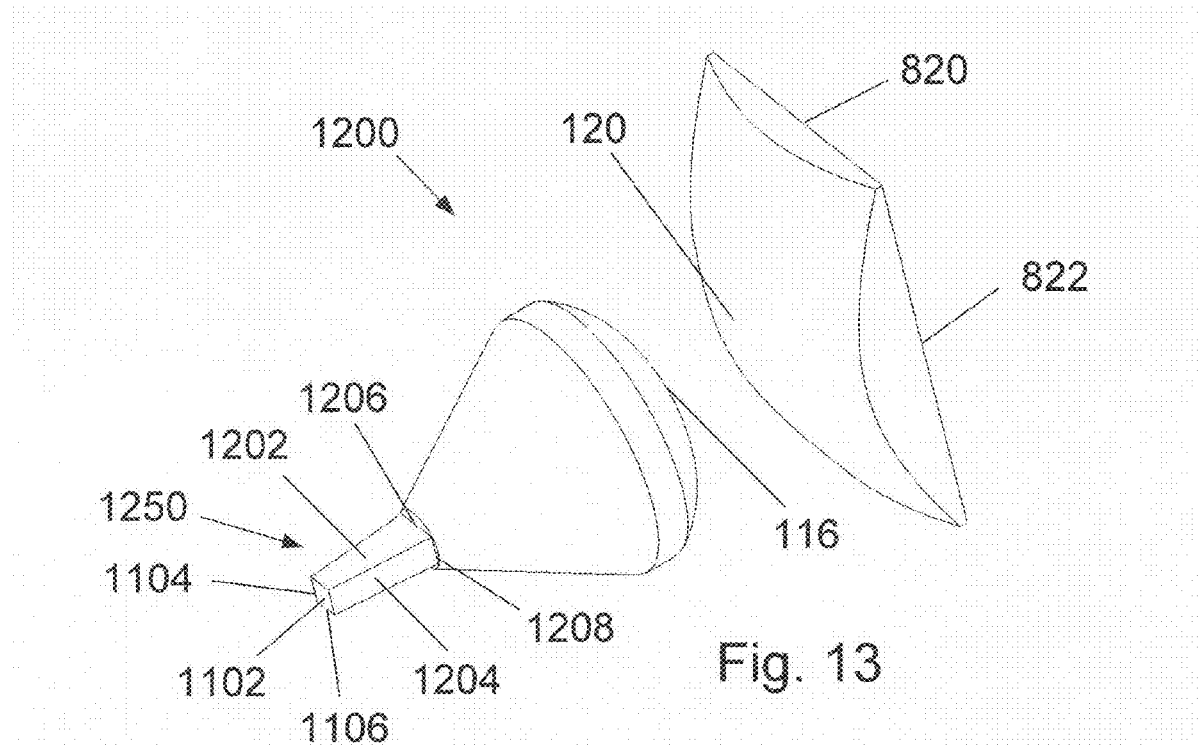
FIG. 13 is a diagrammatic perspective view of the system of FIG. 12 with the non-imaging collection optic replaced with a substaintially straight walled taper.

FIG. 13 shows a system 1200 with a section 1250 replacing section 1150 of system 1100 in FIG. 12. This non-imaging collection optic section 1250 has the same dimension input aperture 1102 and output aperture dimensions 1206 and 1208 as 1120 and 1122 of system 1100. However, the sections connecting the input and output apertures are comprised of straight walls as in a taper. This works for the non-index matched system and results in better homogenization of the light distribution at the input aperture relative to that of 1150, but is characterized by a somewhat more elliptical, rather than rectangular far field than that which is obtained from 1100 at lens 120.

Figure 14:
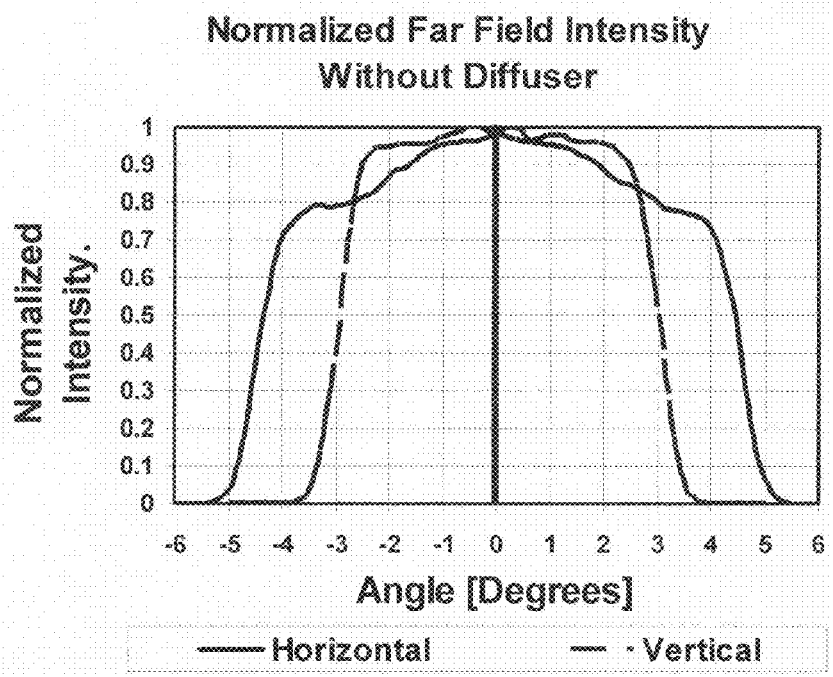
FIG. 14 is a graph showing the far field distribution of the system of FIG. 1 without the diffuser in place.

FIG. 14 represents the normalized far field distribution of the system of FIG. 1 prior to the diffuser 124. Note the narrow extent in the vertical plane as described above. The solid line represents the distribution in the horizontal plane and the dashed line represents that of the vertical plane.

Figure 15:
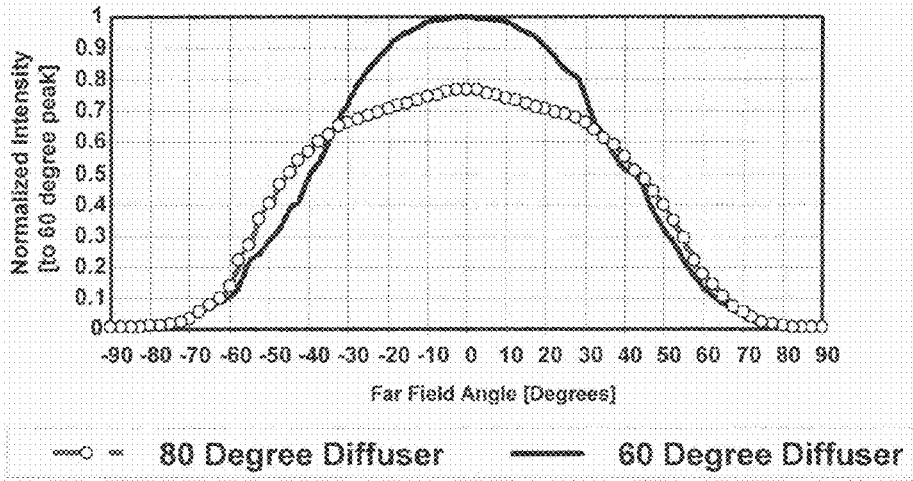
FIG. 15 is a graph showing a plot of the far field distribution for an 80 degree, and a 60 degree holographic diffuser convolved with the horizontal distribution of the source of FIG. 1 shown in the plot of FIG. 14.
Figure 16:
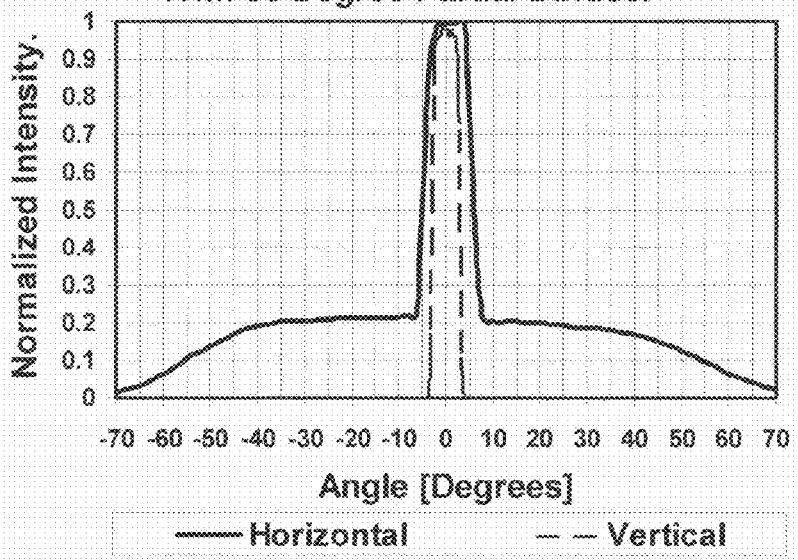
FIG. 16 is a graph showing the horizontal and vertical far field distributions of the system of FIG. 1 with the 80 degree diffuser of FIG. 15 partially covering the output aperture producing a far field, which is the linear combination of the plots of FIGS. 14 and 15.

FIG. 15 represents the horizontal far field distribution of the system of FIG. 1 with an 80 degree full width half maximum (FWHM) Gaussian holographic diffuser, represented by the dotted line, and that of a 60 degree FWHM represented by the solid line, both of which are such as is available from Luminit. The illustrated distributions represent the convolution of the far field distribution in the horizontal plane of system 100 of FIG. 1 prior to the diffuser 124 with that of the near Gaussian distribution of the diffuser 124. If the diffuser 124 does not cover the entire output aperture of the collimating lens array 120, or has a specific ratio of patterned versus non-patterned areas either on a macroscopic or microscopic scale, then for a particular ratio or of patterned versus non-patterned area, the distribution of FIG. 16 results. The ratio of the peak on-axis luminance to that of the off-axis (beyond the far field extent of the system 100 prior to the diffuser) can be controlled to yield any desired value. This is a significant advantage of the invention, as the system's far field distribution can be controlled and readily changed merely by changing the diffuser element only, as opposed to the prior art for which the optical system would have to be changed and retooled to affect such a change in the far field distribution, if even feasible. The solid line of FIG. 16 represents the broad far field obtained in the horizontal plane, and the dashed line represents that of the vertical plane. It is important to note that the shape of the far field in the vertical can be tailored to that which is desired by an appropriate change in the vertical distribution of the elliptical diffuser 124. The composite far field distribution of FIG. 16 represents the linear combination of the distribution that is unmodified by the non-patterned portions of the diffuser 124 and that of the patterned portion, which, again, is the convolution of the pre-diffuser far field distribution with that of the Gaussian distribution of the patterned portion of the diffuser 124.

Figure 17:
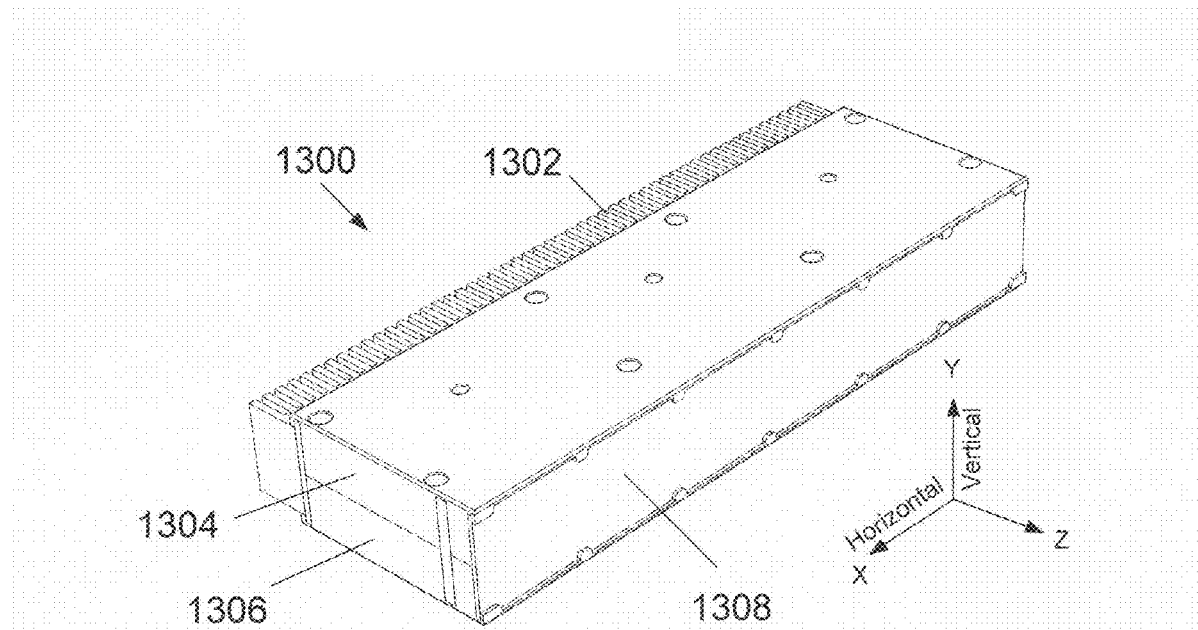
FIG. 17 is a diagrammatic perspective of an alternative embodiment to the system of FIG. 1.
Figure 18:
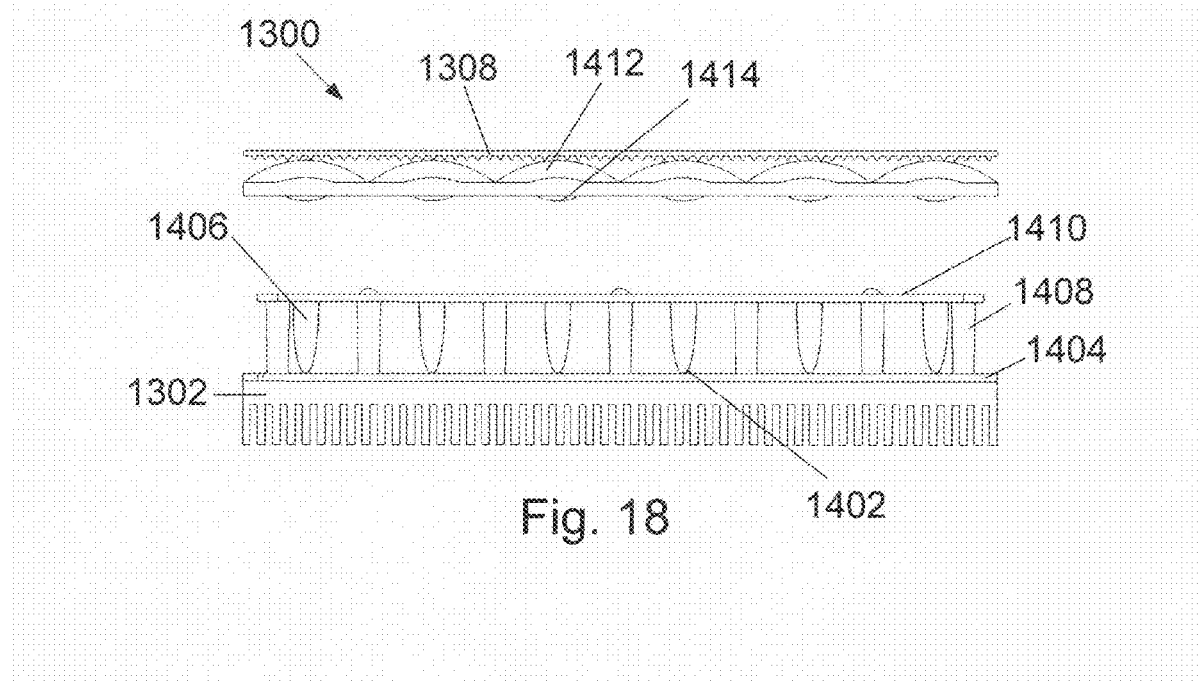
FIG. 18 shows a top view (X-Z plane) of the system of FIG. 17 with parts removed.

Referring now to FIG. 17, there is shown a system 1300 that represents an alternative embodiment to the system 100 of FIG. 1. A housing represented by top and bottom sections 1304 and 1306, respectively, act as a claim shell to house a collection optics array 1410 of the system shown in top plan view in FIG. 18 along with a collimation lens array 1412, a heat sink 1302, and a diffuser 1308. A COB PCB 1404 is shown comprising six (6) LED die and can contain drive electronic components analogous to PCB 106 of system 100 of FIG. 1.

Figure 19:
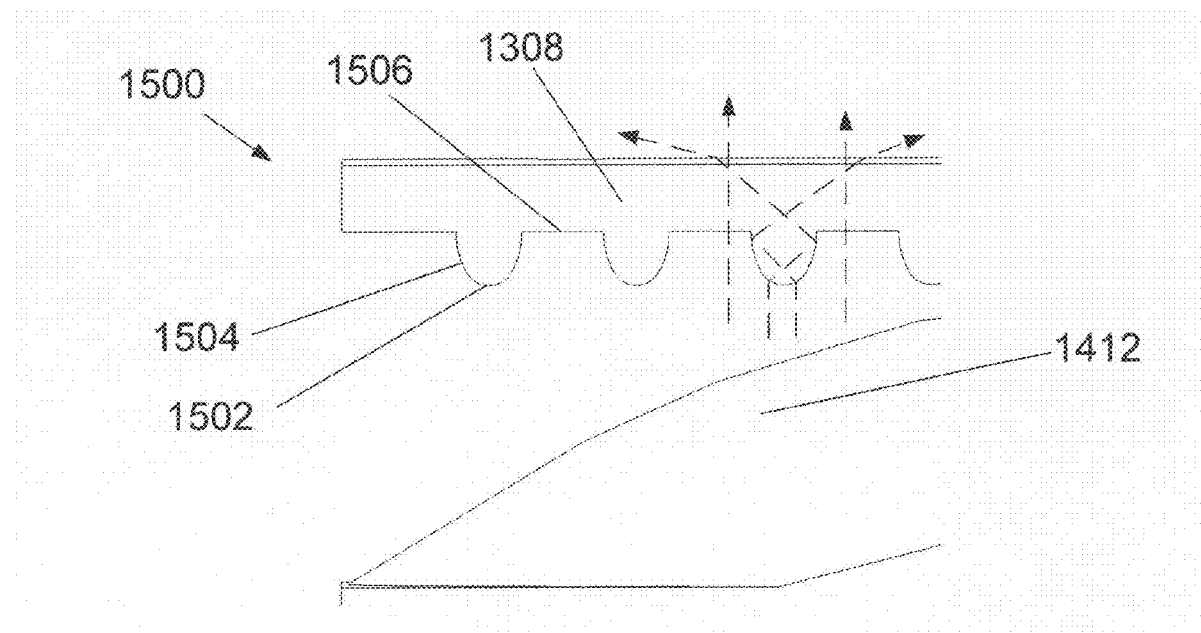
FIG. 19 is a diagrammatic top view of a detail of the diffuser of the system of FIG. 18.
Figure 20:
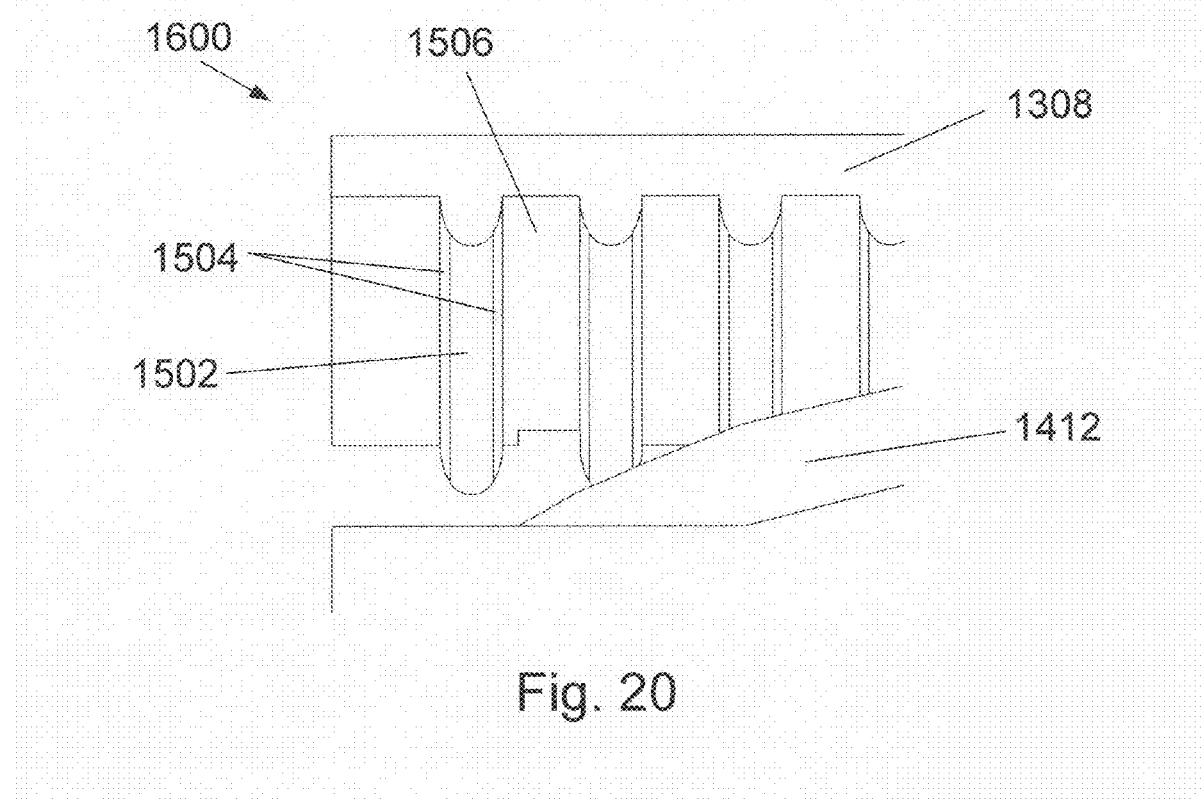
FIG. 20 is a diagrammatic perspective view of the bottom of the diffuser of FIG. 19.
Figure 21:
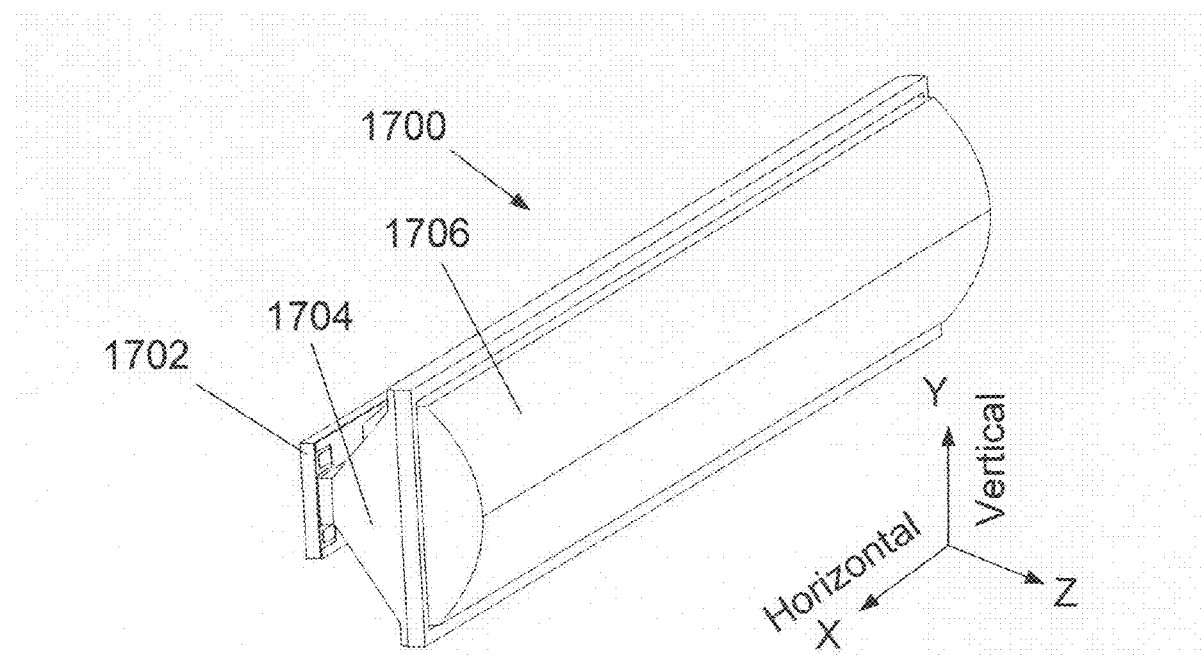
FIG. 21 is a diagrammatic perspective view of another alternative embodiment of a "Chip-on-Board" LED emergency light module.

FIGS. 19 and 20 show close up views 1500 and 1600, respectively, indicating details of a diffuser which is distinct from the design of that outlined in conjunction with the system 100 of FIG. 1. Here, plastic moldable macroscopic cylindrical segments protruding from the main diffuser substrate 1308 are comprised of aspheric cylindrical sections 1502 with symmetric sides 1504. Low divergence angle light entering diffuser sections 1502 are refracted and then totally internally reflected by sides 1504 (or reflected if they are coated with a mirror on the outside) and, upon exiting into the main substrate 1308, are deflected over a range of angles substantially in the horizontal, but not vertical plane. The light entering the flat sections between the cylindrical segments is not changed in angle upon passing through the substrate 1308. Thus, by controlling the pitch of the cylindrical segments, the ratio of unaltered to diffused light in the horizontal plane is modified such as was described by the diffuser 124 of system 100.

FIGS. 21 through 27 represent another alternative embodiment of the LED emergency light of FIG. 1. A system 1700 of FIG. 21 comprises a COB PCB 1702 comprising twenty one

Figure 22:
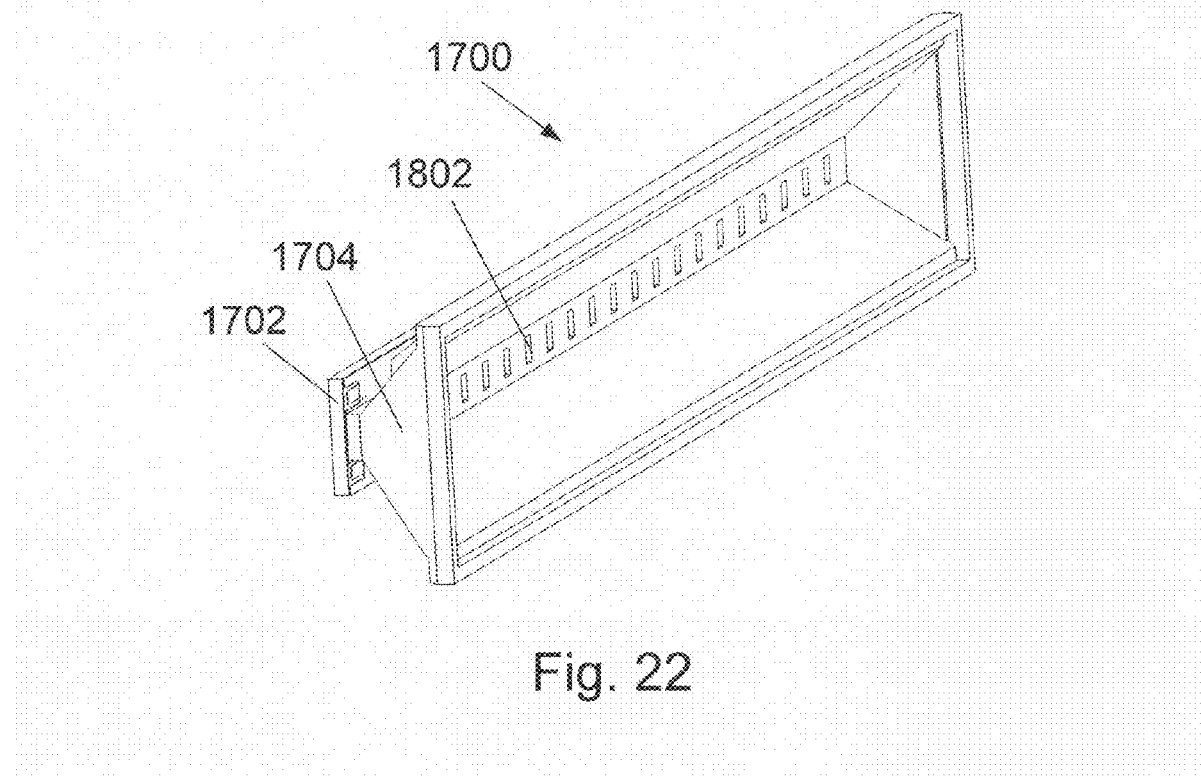
FIG. 22 shows the system of FIG. 21 with the cylindrical collimation optic removed.
Figure 23:
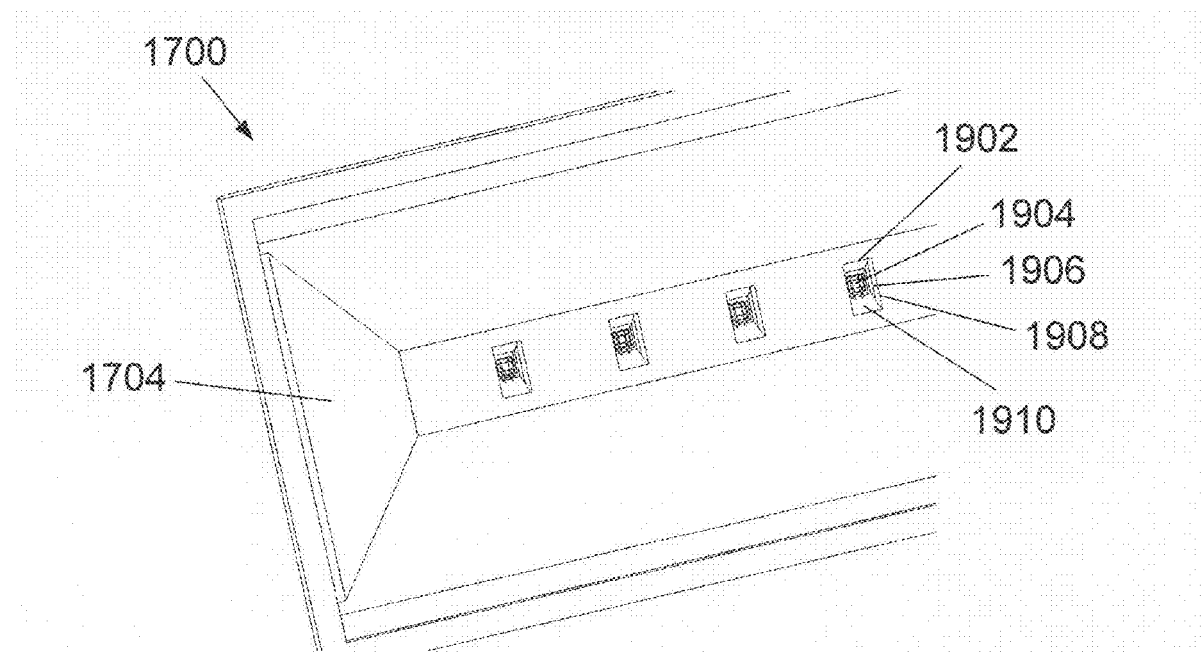
FIG. 23 is an enlarged diagrammatic view of the collection optic array and LED die of the system of FIG. 21.
Figure 24:
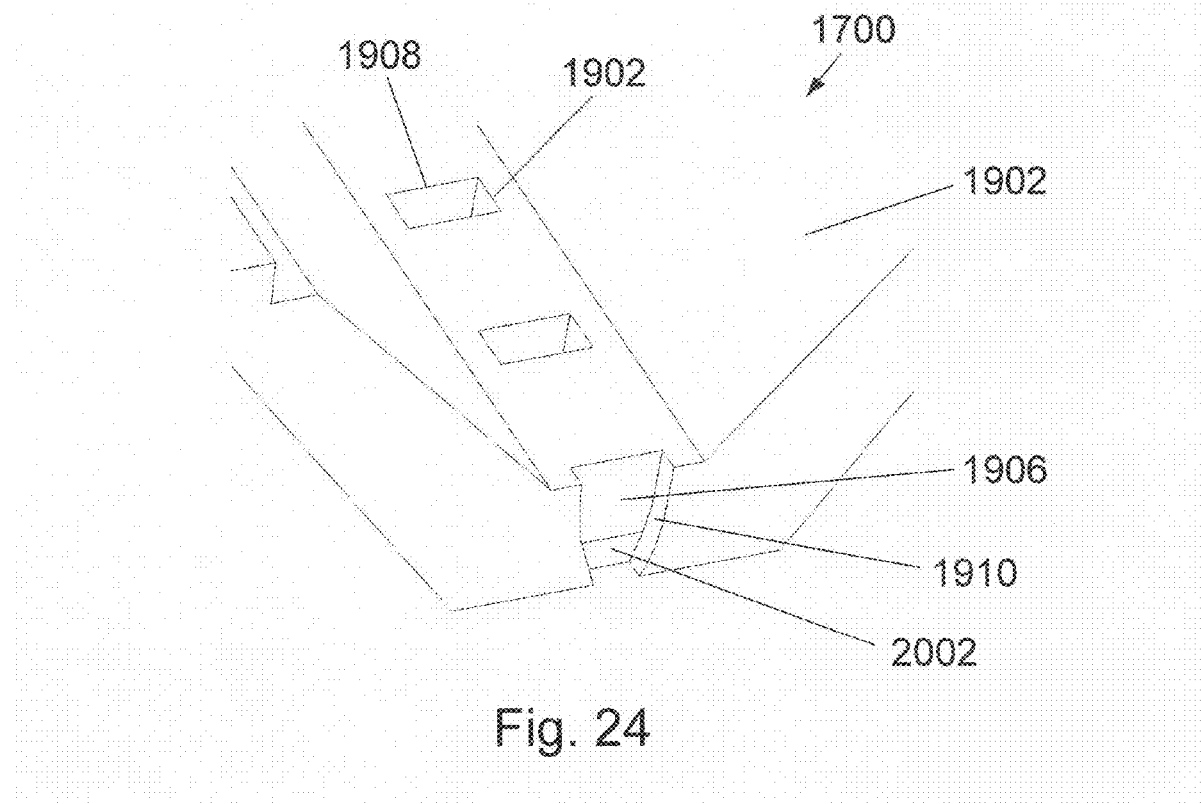
FIG. 24 is an enlarged diagrammatic section view of one of the collection optics of the system of FIG. 23.

(21) individual LED die and associated corresponding hollow rectangular CPC's in a linear array 1802 of system 1700 as shown in FIG. 22. The hollow CPC's are formed into a molded holder 1704 which attaches to the PCB 1702 and to an aspheric cylindrical collimation lens 1706. In this case, the far field distribution in the horizontal plane is obtained solely by the far field of the output of each of the individual CPC sections by walls 1906 and 2002 as seen in of FIGS. 23 and 24, respectively. Section 1906 is of the form of a CPC. Section 2002 is a straight walled conic section for the purpose of increasing the output divergence angle beyond that which would otherwise exit the CPC section 1906 and allows for a larger input aperture consistent with the size of the LED die, which is on the order of 1.1 mm per side, typically, but could be any desired size that is readily available. The shape of the cylindrical lens 1706 must be chosen carefully as not to result in total internal reflection of skew rays. Otherwise, the throughput would be compromised.

The divergence in the vertical axis is controlled by the combination of the size of the output aperture 1908 (See FIG. 24) and the lens focal length to be relatively small consistent with that of the system 100 of FIG. 1. One advantage of this approach is that it is feasible to use a reduced LED die to die spacing thereby increasing the number of LED die per unit length thus allowing for operation at a lower current density per die thus resulting in higher overall system level efficiency. The disadvantage of this embodiment relative to the system 100 of FIG. 1 is that the far field distribution in the horizontal plane is necessarily flatter and therefore does not result in as high a near-zero angle luminance.

Figure 25:
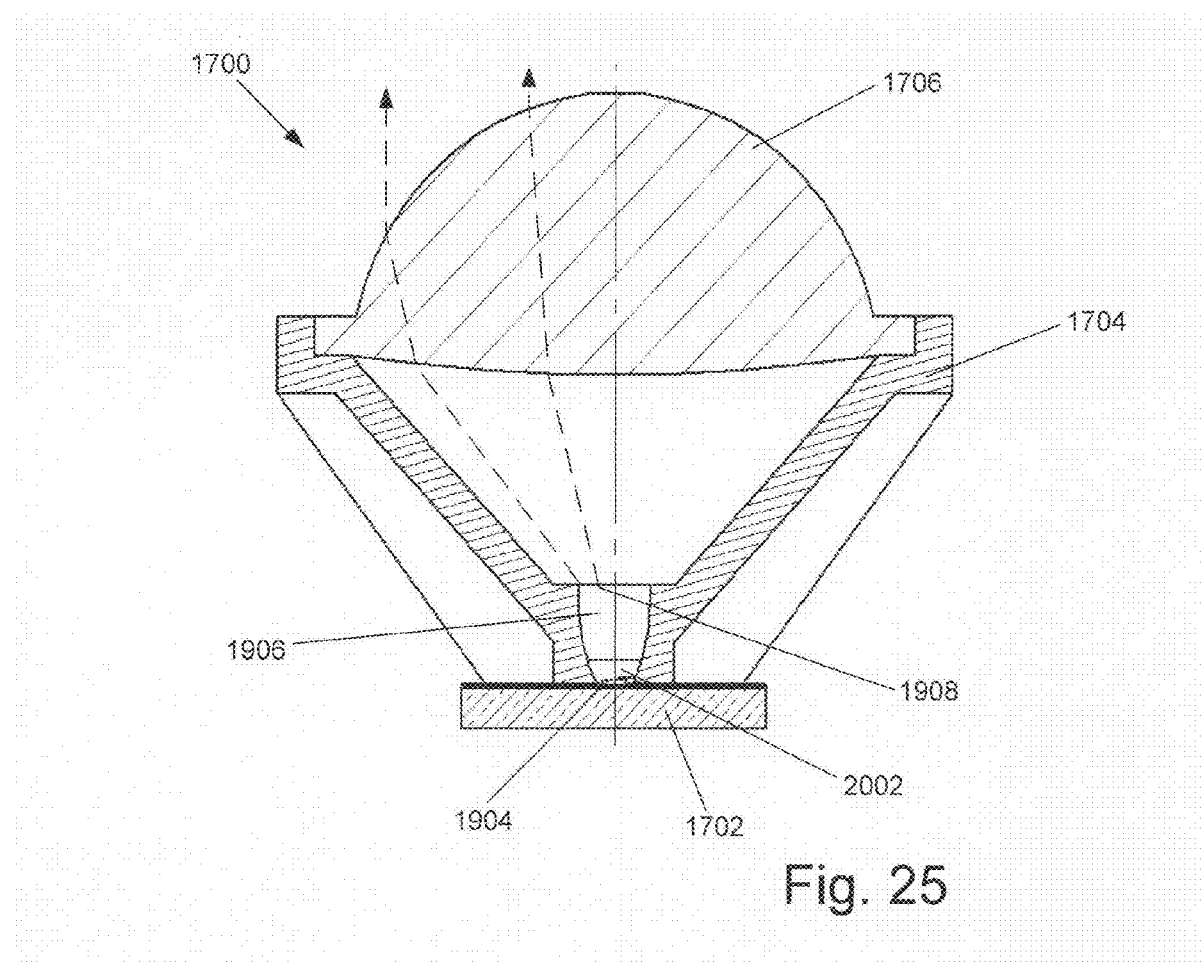
FIG. 25 is a diagrammatic cross-sectional view in the Y-Z plane of the system of FIG. 21.

FIG. 25 shows a diagrammatic cross-sectional Y-Z plan view of parts of the system 1700 illustrating ray paths through its optics The path of the rays exiting the CPC aperture 1908 are indicated for one side by the dashed arrows. The LED die 1904 can be seen at the input to the conical section 2002 of the CPC section 1906.

Figure 26:
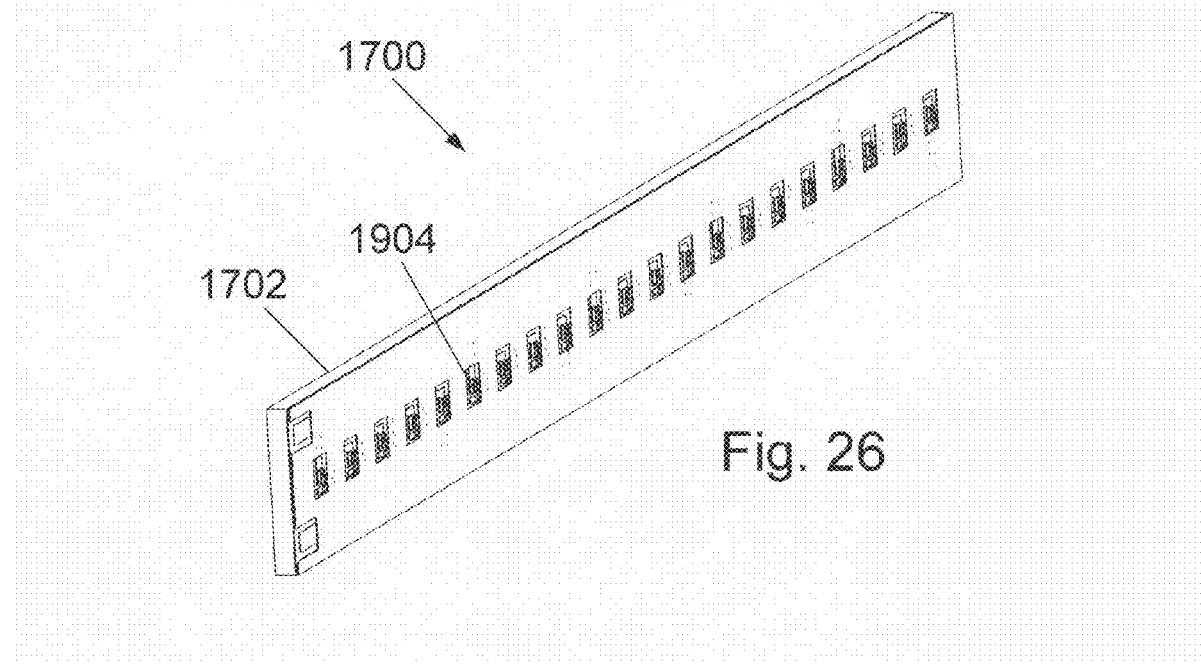
FIG. 26 is a diagrammatic perspective view showing the LED "Chip-on-Board" printed circuit board of the system of FIG. 21.
Figure 27:
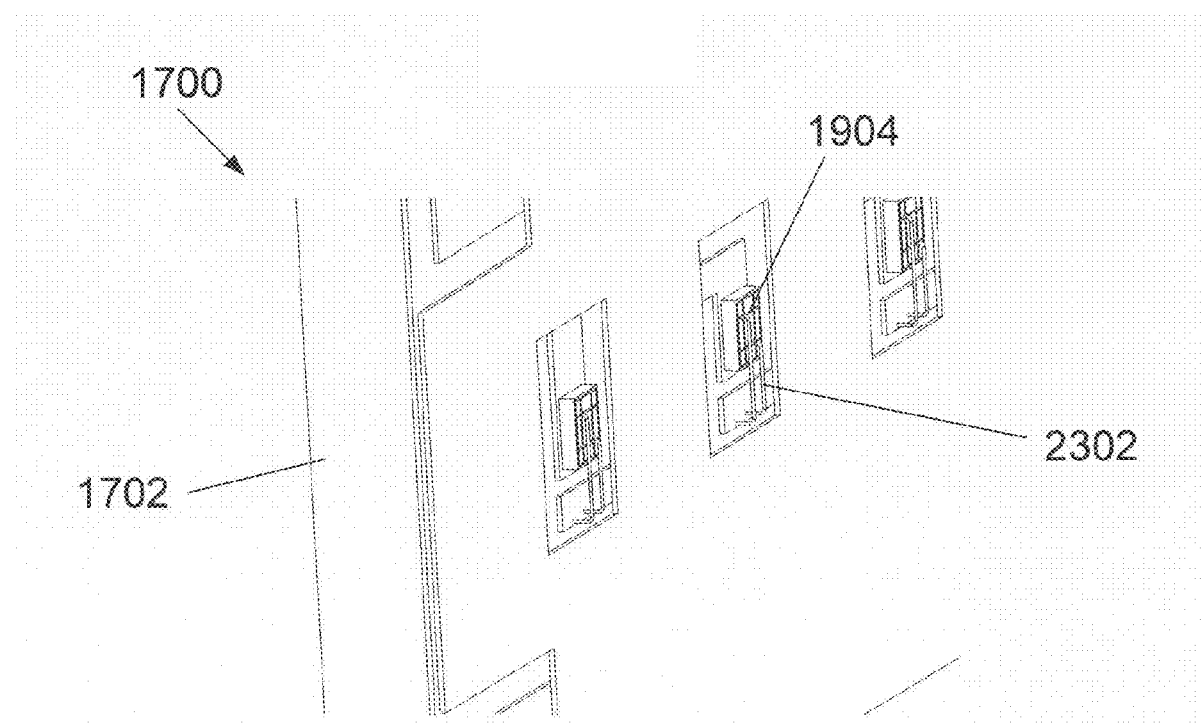
FIG. 27 is an enlarged diagrammatic perspective view of the system of FIG. 26 showing detail of the LED die and wire bonds.

FIGS. 26 and 27 represent, respectively, the COB PCB 1702 shown in perspective and in partial close up view showing detail of the LED die 1904 attachment to the board 1702 as well as wire bonds 2302. Typically, wire bonds 2302 for this system and the system 100 of FIG. 1 are comprised of aluminum or gold between about 0.030 and 0.050 mm in diameter. The LED die for both systems are typically attached by means of solder, epoxy, or eutectic attachment. Generally, solder and eutectic attachment are preferred due to their superior thermal performance in comparison to thermally and electrically conductive epoxies.

Figure 28:
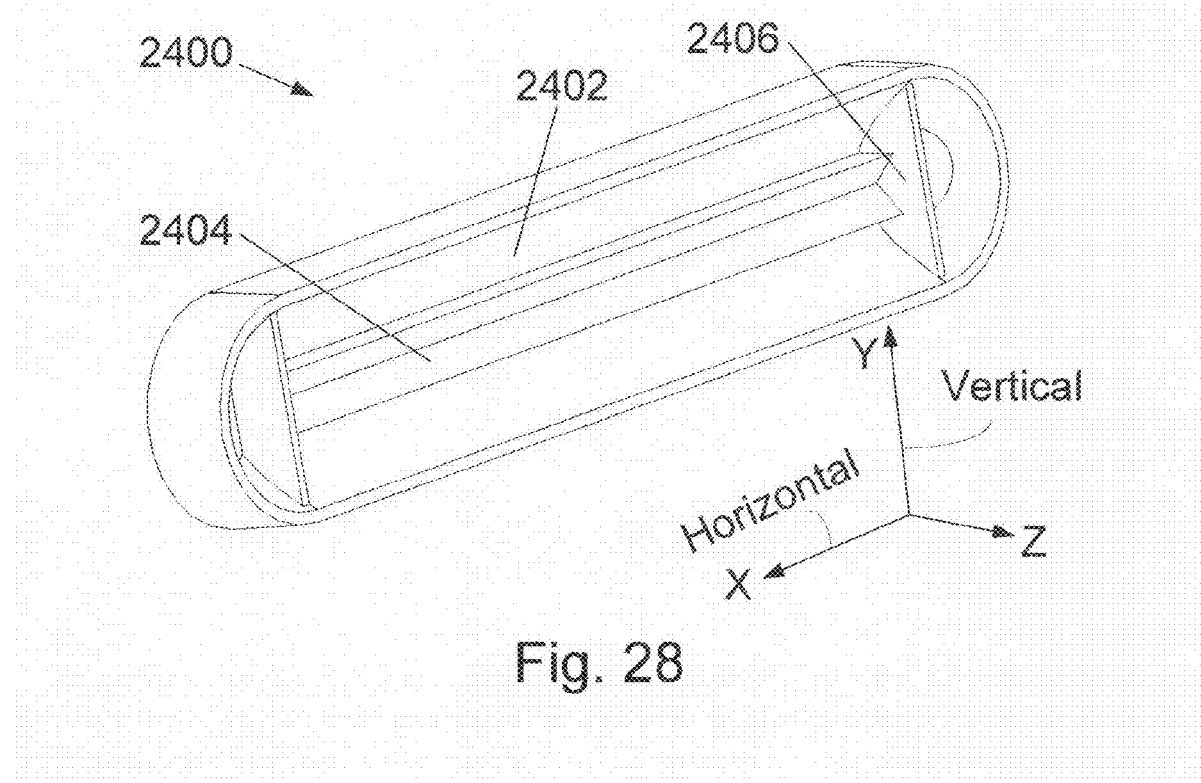
FIG. 28 is a diagrammatic perspective view of another alternative embodiment of a "Chip-on-Board" LED emergency light module using a hybrid total internal reflection (TIR) collection optic.
Figure 29:
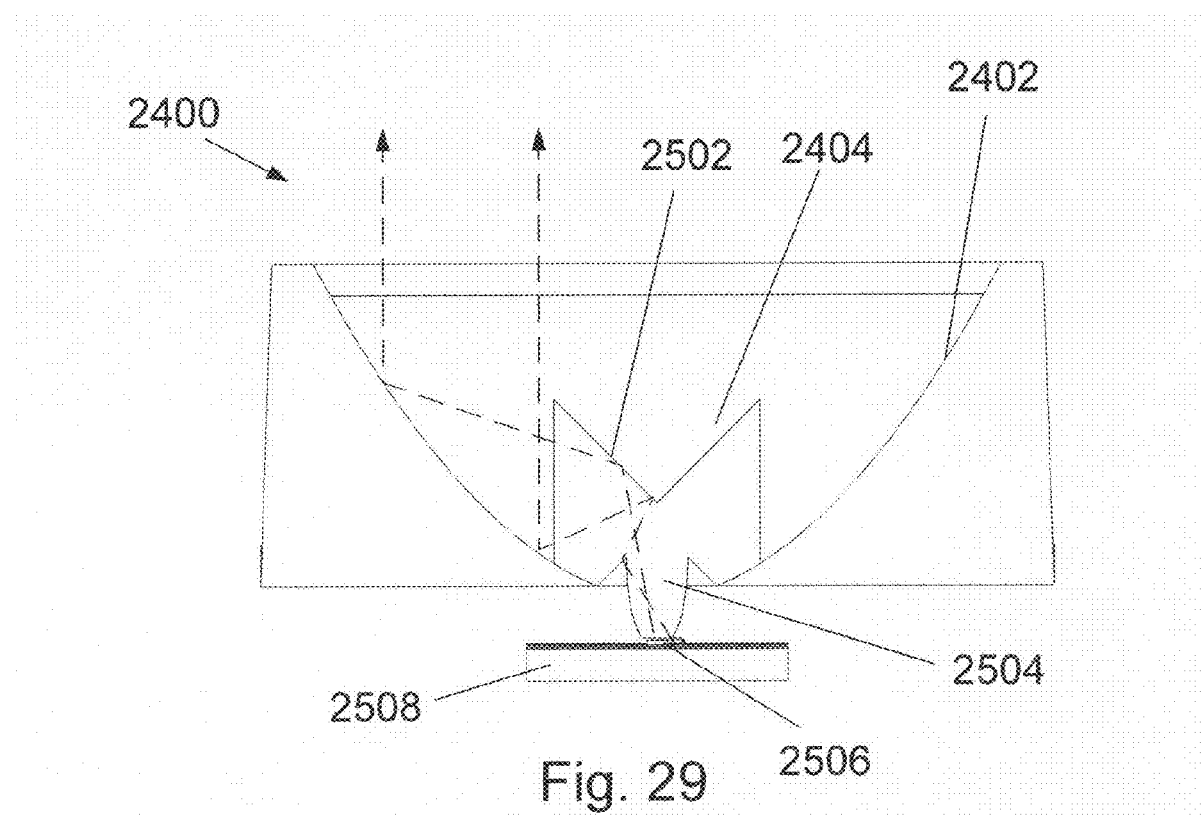
FIG. 29 is a diagrammatic elevational view in the Y-Z plane of the system of FIG. 28.
Figure 30:
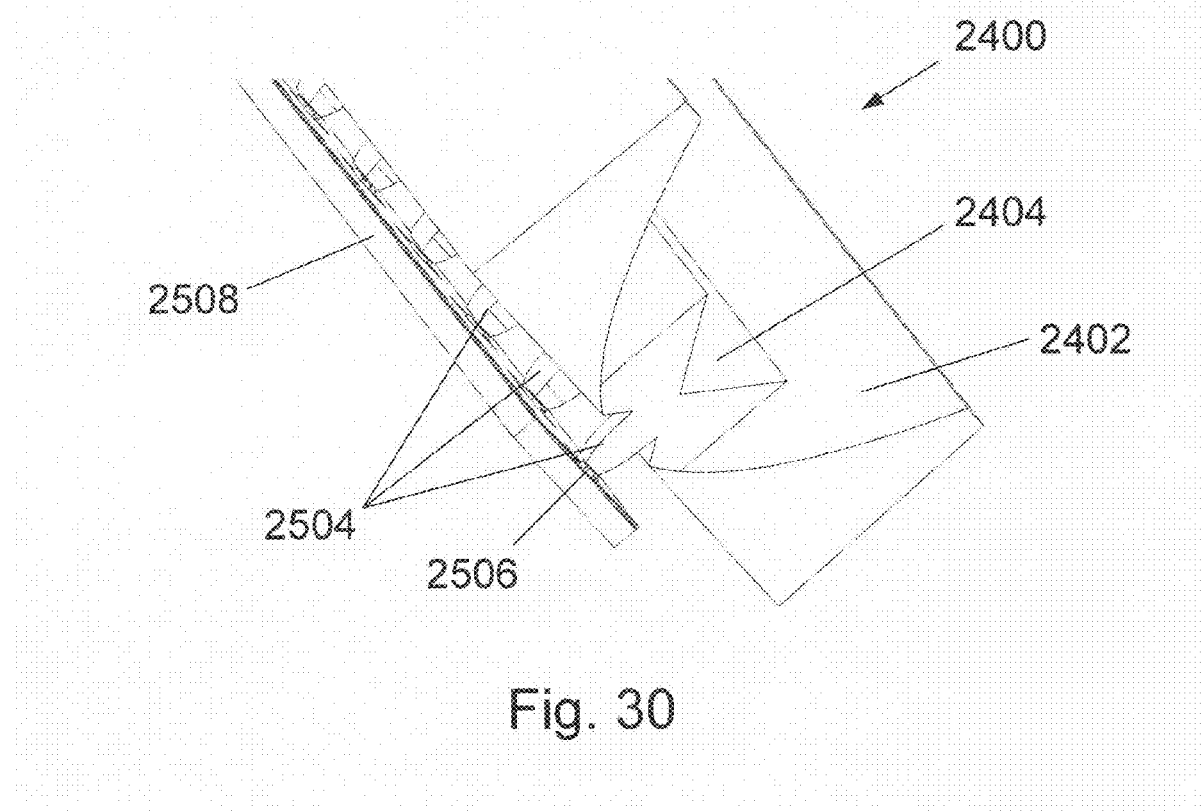
FIG. 30 is a diagrammatic sectional view of the system of FIG. 28 showing individual collection optics associated with each LED.

Yet another embodiment of the invention is represented by a system 2400 shown in FIG. 28 with cylindrical total internal reflecting (TIR) element 2404 with solid dielectric CPC sections 2504 as shown in the systems of FIGS. 29 and 30, respectively. The path of the light rays is indicated by the dashed lines in traveling from an LED die 2506 through the CPC section 2504, reflecting off section 2502, and reflecting off a cylindrical parabolic section 2402. The divergence in the horizontal plane is also dictated by that leaving the CPC section, as all other optical power elements are limited to affecting the horizontal far field only.

Figure 31:
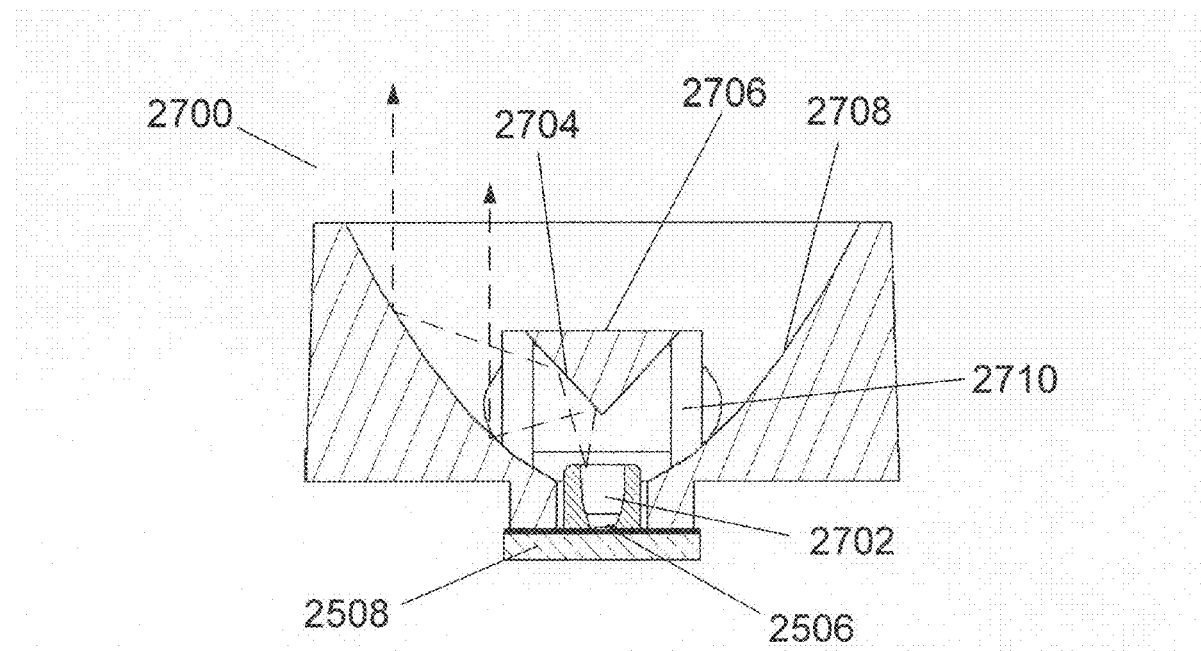
FIG. 31 is a diagrammatic elevational view of an alternative embodiment of the system of FIG. 29 indicating replacement of the solid TIR collection optic with a hollow non-imaging collection optic and prism-shaped cylindrical mirror.

FIG. 31 shows a similar system 2700 to that of system 2400 of FIG. 28 for which the composite dielectric CPC and reflector are replaced with a hollow CPC 2702 and front surface reflecting prism 2706. Legs 2710 are used to support a front surface 2704 mirrored prism 2706.

Figure 32:
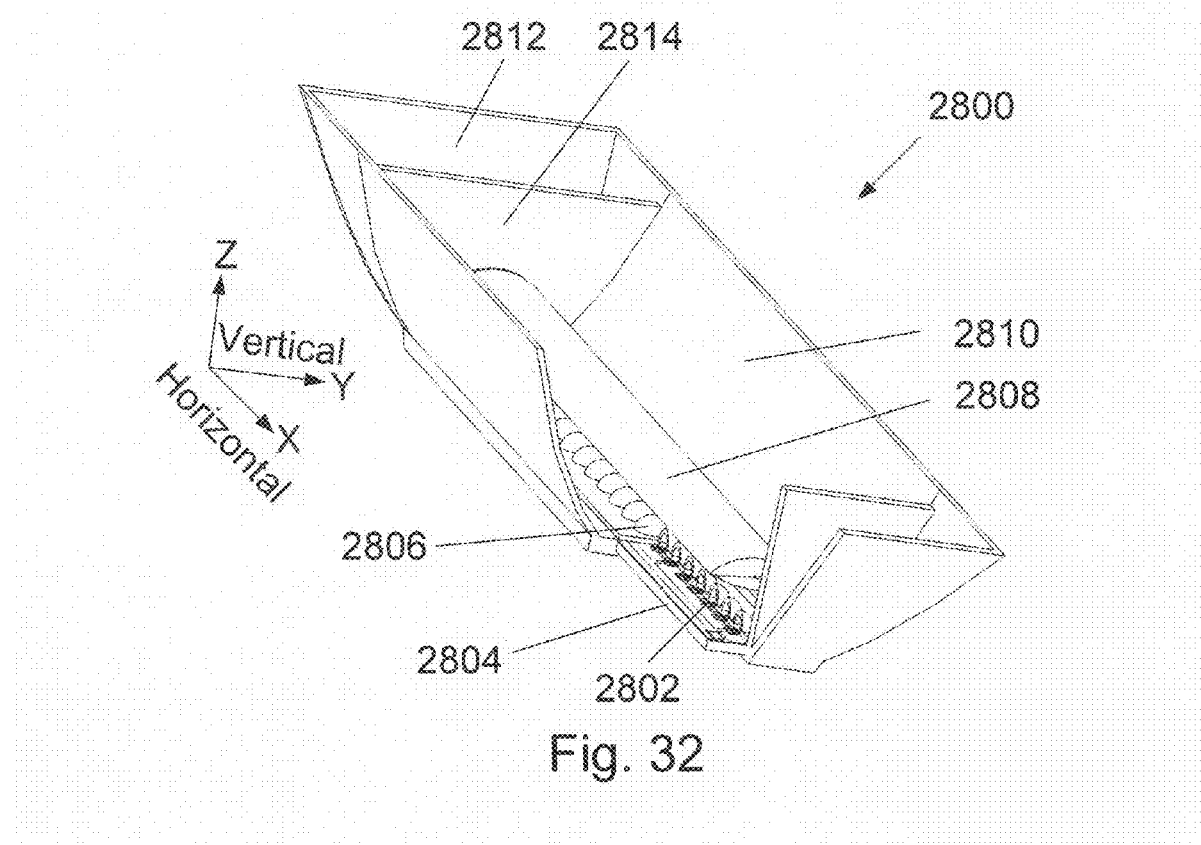
FIG. 32 is a diagrammatic perspective view with parts broken away of another alternative embodiment of a "Chip-on-Board" LED emergency light module using a cylindrical lens, but no collection optic.
Figure 33:
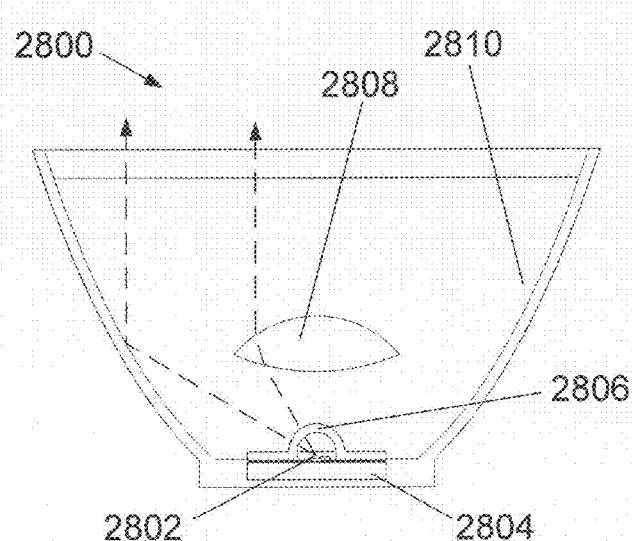
FIG. 33 is a diagrammatic elevational view in the Y-Z plane of the system of FIG. 32.

A final linear array LED emergency light module alternative embodiment is shown as system 2800 in FIGS. 32 and 33. A COB PCB 2804 is shown with multiple LED die, each with its own plastic dome typically filled with index matching gel. Alternatively, the domes could be over-molded out of a material such as silicone. With reference to FIG. 33, the light exiting in the Y-Z plane is either redirected by refraction by a cylindrical lens 2808 or by a cylindrical parabolic section 2810 in the Z direction. In the orthogonal X-Z horizontal plane, the far field is substantially Lambertian (falls off as cos θ). If, however, the LED die is not positioned near the center of curvature of the dome, but is further away, then the dome acts as a lens to redirect some of the light in the horizontal plane to smaller angles and a tighter distribution than that which would otherwise be obtained. The ends of the parabolic reflector section 2810 can be parallel to the Y-Z plane in which case they have no affect on the horizontal far field distribution, or they can be tilted as represented by end caps 2812 (See FIG. 32) on each side, in which case they act to redirect some of the light in the horizontal plane that would otherwise map into larger angles, to smaller angles thereby increasing on-axis luminance.

Figures 34A, 34B:
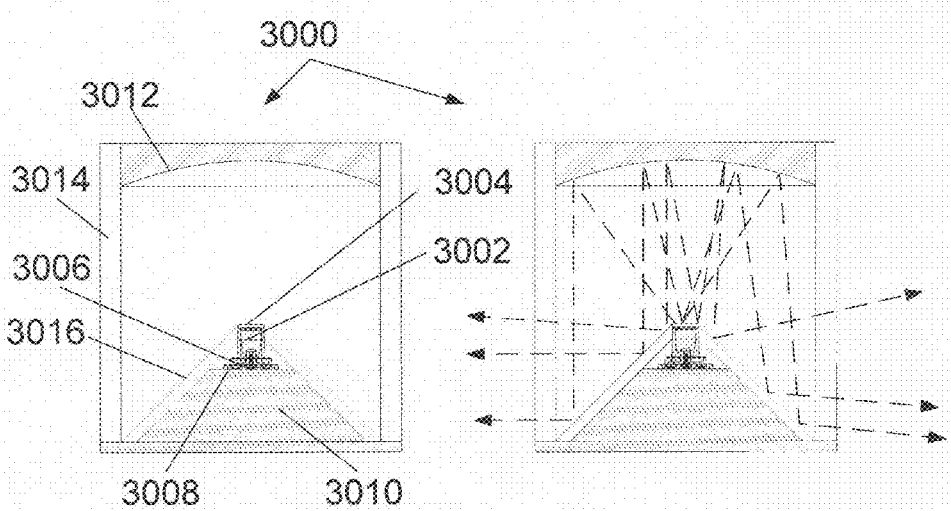
FIGS. 34A and 34B are diagrammatic cross sectional elevational views of a rotationally symmetric LED emergency light which produces a 360 degree azimuthal beam with narrow divergence in the elevation plane. The light ray paths are indicated by dotted lines in FIG. 34B of the system of FIG. 34A.
Figure 35:
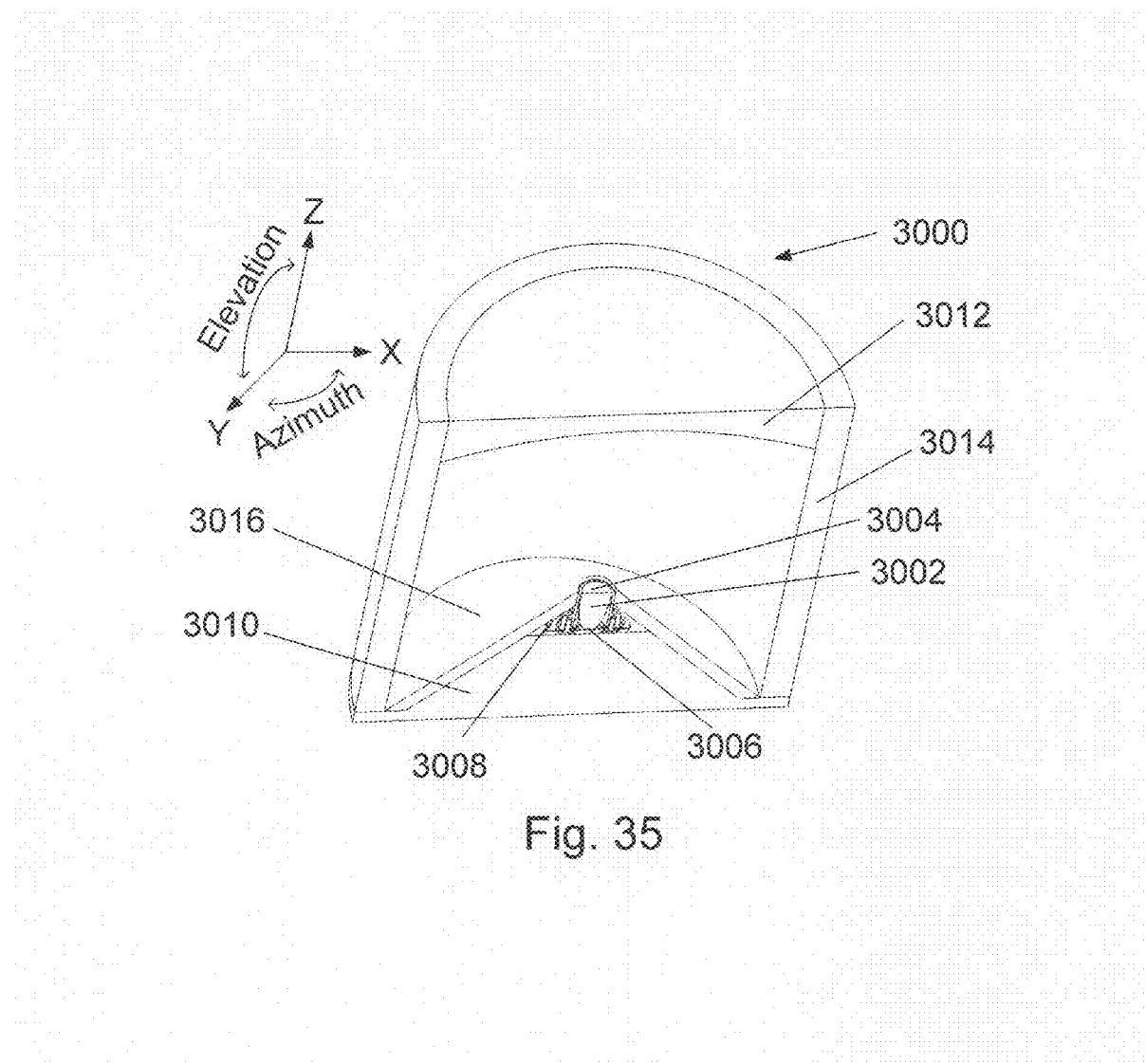
FIG. 35 is a diagrammatic isometric view of one half of the sectioned system of FIG. 34A.

FIGS. 34A, 34B and 35 show a system 3000 comprising an LED emergency light which transforms the symmetric output of a single CPC 3002 with one or more LED die at its input aperture, to a beam of light with complete 360 degree azimuthal coverage and limited divergence in elevation symmetric (or non-symmetric) about the X-Y horizontal plane. This is the type of emergency light that would replace rotating tungsten halogen beacons with 360 degree (by rotation) azimuthal coverage that would be used on emergency vehicles such as tow trucks and snow plows. It also has application in aviation and marine lighting. The advantage to this approach is that there are no moving parts and it can be pulsed at much higher luminance relative to the tungsten halogen solutions observed in prior art. An LED module 3006 of the type represented by the 40 degree half angle divergence LumiBright offered by Innovations in Optics, Inc. of Woburn, Mass., is located on top of a heat sink 3010 that acts secondarily as a base for an outer cylindrical window 3014 which is made out of materials such as optically transparent plastics, rigid silicones or glass. The output of the LED source's CPC 3002 is directed downward by parabolic reflector 3012 such that the focus of the parabolic section is substantially coincident with the output face of the CPC 3002. The downward directed light is then reflected off of a straight conical mirrored section 3016 to the far field. If desired, the reflective cone 3016 can have some curvature to redistribute the light in the elevation plane. The light then passes un-deviated in angle through the cylindrical window 3014, which also acts to hold the parabolic reflector 3012 in position. Alternatively, the parabolic mirror 3012 can have other shapes including spherical, elliptical, hyperbolic, compound parabolic, flat or conical, or combinations thereof, which would act in concert with the form of the reflector 3016, which could also take on similar shape profiles. The hole in the reflector 3016 is small in area in comparison to the lighted portion of the reflector so it represents minimal loss in light and any light that does re-enter the CPC has an opportunity to be reflected back out off the LED die or die array, thereby representing a negligible loss in light. The top portion of the window, above the rays passing through the window, as indicated by the dashed lines representing the path of light in FIG. 34B, show that it could be opaque with only the area through which light passes being required to be transparent. Alternatively, the system 3000 could be oriented upside down such that only the area through which light exists need be visible, which would allow for a much shorter profile. This would also allow fins to be located on the heat sink for better heat transfer to the air. Any wires required for power or control can be routed up the inner wall of the window 3014 or alternatively straight up the central axis, with negligible blockage of light or alternatively, transparent conductors can be deposited on the inside of the window 3014. If desired, the input to the CPC 3002 can have a premixing segment preferably faceted with an even number of sides between about 4 and 10 to act to mix multiple colored LED die if it were desired to have multiple colors emitted either simultaneously or sequentially. If desired, for example, the LEDs could be red, amber (A), green, and blue, which can produce any desired color, including white and saturated red, amber, green, or blue. Alternatively, white LEDs can be used with or without index matching between the phosphor coated LEDs and the input aperture of the CPC 3002. Alternatively, the CPC 3002 can be replaced with a taper which can be round or square at its input and or output, which can also act as an effective light homogenizer if multiple colors were desired.

Having described preferred and alternative embodiments of the invention, those skilled in the art will recognize that other variants of it are possible in accordance with the teachings herein.

What is claimed is:

1. A lighting apparatus, comprising:
   a linear array of light emitting diodes (LEDs) each having a light emitting area and having a spacing between the light emitting area and light emitting area of an adjacent LED, each of the LEDs having an optical axis defined normal to the light emitting area;
   a linear array of non-imaging concentrators each disposed along a respective one of the optical axes and being optically coupled to a respective one of the LEDs to receive radiation emitted therefrom, each of the non-imaging concentrators having an output aperture through which the received radiation propagates;
   a linear array of collimating optics each disposed along a respective one of the optical axes and having a focal length, each of the collimating optics being separated along the respective one of the optical axes from the output aperture of a respective one of the non-imaging concentrators by a distance substantially equal to the focal length to thereby image the output aperture of the non-imaging concentrator at infinity; and
   a diffuser disposed substantially normal to the optical axes wherein the diffuser selectively increases the far field divergence of radiation propagating from the linear array of collimating optics in at least one of two mutually orthogonal planes.

2. The lighting apparatus of claim 1 wherein the output aperture of each non-imaging concentrator is at a focal plane of a respective one of the collimating optics.

3. The lighting apparatus of claim 1 wherein each of the collimating optics comprises of group optical elements disposed along a respective one of the optical axes and wherein the focal length is a focal length of the group of optical elements.

4. The lighting apparatus of claim 1 wherein each of the collimating optics comprises a plurality of refractive surfaces spaced apart from each other along a respective one of the optical axes.

5. The lighting apparatus of claim 1 wherein each one of the output apertures of the non-imaging concentrators is spaced apart from the other output apertures and is not in contact with any of the other output apertures.

6. The lighting apparatus of claim 1 wherein the LEDs are selected from the group comprising red LEDs, amber LEDs, green LEDs, and blue LEDs.

7. The lighting apparatus of claim 1 wherein the non-imaging concentrators are selected from the group comprising compound parabolic concentrators, elliptical concentrators, hyperbolic concentrators, straight taper concentrators, and concentrators having curvatures defined by high order polynomial functions.

8. The lighting apparatus of claim 1 wherein each of the non-imaging concentrators has a rectangular cross-section.

9. The lighting apparatus of claim 1 wherein the linear array of LEDs is disposed on a printed circuit board.

10. The lighting apparatus in claim 1 wherein each of the collimating optics comprise at least one reflective surface.

11. The lighting apparatus of claim 1 wherein the diffuser comprises an elliptical diffuser.

12. The lighting apparatus of claim 1 wherein the diffuser comprises an optical element having a selectively textured surface.

13. The lighting apparatus of claim 1 wherein the diffuser comprises a holographic element.

14. The lighting apparatus of claim 1 wherein the diffuser comprises a plurality of macroscopic refracting elements.

15. The lighting apparatus of claim 1 wherein the light emitting area of each LED comprises a plurality of light emitting areas each having a different spectral output.

16. The lighting apparatus of claim 1 wherein further comprising a heat sink in thermal communication with the LEDs.

* * * * *

UNITED STATES PATENT AND TRADEMARK OFFICE
CERTIFICATE OF CORRECTION

| | | |
|---|---|---|
| PATENT NO. | : 8,764,238 B2 | Page 1 of 1 |
| APPLICATION NO. | : 12/610418 | |
| DATED | : July 1, 2014 | |
| INVENTOR(S) | : Thomas John Brukilacchio | |

It is certified that error appears in the above-identified patent and that said Letters Patent is hereby corrected as shown below:

In the Specification

Column 4, Line 36:
• Replace the word "collection" with the word "collecting" in the phrase "The non-imaging collection optic section".

In the Claims

Column 14, Claim 3, Line 5:
• Replace the phrase "comprises of group optical elements" with the phrase "comprises a group of optical elements".

Column 14, Claim 6, Line 19:
• Delete "," from the phrase "green LEDs, and blue LEDs.".

Column 14, Claim 10, Line 29:
• Replace the word "in" with the word "of" in the phrase "The lighting apparatus in claim 1 wherein".

Column 14, Claim 16, Line 44:
• Delete the word "wherein" from the phrase "The lighting apparatus of claim 1 wherein further comprising".

Signed and Sealed this
Twenty-third Day of September, 2014

Michelle K. Lee
*Deputy Director of the United States Patent and Trademark Office*